US012034547B2

(12) United States Patent
Cheong et al.

(10) Patent No.: US 12,034,547 B2
(45) Date of Patent: Jul. 9, 2024

(54) METHOD FOR TRANSCEIVING DATA IN BLUETOOTH NETWORK ENVIRONMENT AND ELECTRONIC DEVICE THEREOF

(71) Applicant: SAMSUNG ELECTRONICS CO., LTD., Suwon-si (KR)

(72) Inventors: Gupil Cheong, Suwon-si (KR); Hangil Moon, Suwon-si (KR); Sanghoon Lee, Suwon-si (KR); Juyeon Jin, Suwon-si (KR); Doosuk Kang, Suwon-si (KR); Bokun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 231 days.

(21) Appl. No.: 17/136,561

(22) Filed: Dec. 29, 2020

(65) Prior Publication Data

US 2021/0203454 A1 Jul. 1, 2021

(30) Foreign Application Priority Data

Dec. 31, 2019 (KR) .................. 10-2019-0180086
Dec. 28, 2020 (KR) .................. 10-2020-0184365

(51) Int. Cl.
*H04L 1/00* (2006.01)
*H04L 1/1812* (2023.01)
(Continued)

(52) U.S. Cl.
CPC .......... *H04L 1/1832* (2013.01); *H04L 1/1819* (2013.01); *H04W 56/001* (2013.01); *H04W 72/0446* (2013.01); *H04W 76/15* (2018.02)

(58) Field of Classification Search
None
See application file for complete search history.

(56) References Cited

U.S. PATENT DOCUMENTS

| 7,486,932 B2 | 2/2009 | Palin et al. |
| 8,219,142 B2 | 7/2012 | Khairmode et al. |

(Continued)

FOREIGN PATENT DOCUMENTS

| WO | 2006/090254 | 8/2006 |
| WO | 2014/189619 | 11/2014 |

OTHER PUBLICATIONS

International Search Report issued Apr. 23, 2021 in corresponding International Application No. PCT/KR2020/019252.

*Primary Examiner* — Mujtaba M Chaudry
(74) *Attorney, Agent, or Firm* — Nixon & Vanderhye P.C.

(57) ABSTRACT

Disclosed is an electronic device including: a first communication circuit configured to support wireless communication, a second communication circuit configured to support Bluetooth communication, a processor operatively connected to the first communication circuit and the second communication circuit, and a memory operatively connected to the processor. The processor may be configured to control the electronic device to: create a link with a first device based on a synchronous connection protocol using the second communication circuit, receive, from the first device via the link, second data obtained by the first device on a second time slot among a plurality of time slots of a transmission/reception period of the link, receive third data including additional data for the second data within a retransmission window configured for data retransmission among the plurality of time slots, and transmit audio data generated based on the second data and the third data to an external electronic device using the first communication circuit.

13 Claims, 23 Drawing Sheets

(51) Int. Cl.
*H04L 1/1829* (2023.01)
*H04W 56/00* (2009.01)
*H04W 72/0446* (2023.01)
*H04W 76/15* (2018.01)

(56) References Cited

U.S. PATENT DOCUMENTS

| | | | |
|---|---|---|---|
| 8,447,350 B2 | 5/2013 | Khairmode et al. | |
| 8,602,788 B2 | 12/2013 | Fishel | |
| 9,002,282 B1* | 4/2015 | de la Broise | H04W 88/06 |
| | | | 455/553.1 |
| 9,531,501 B2 | 12/2016 | Linde et al. | |
| 9,712,266 B2 | 7/2017 | Linde et al. | |
| 10,178,711 B2 | 1/2019 | Li et al. | |
| 10,602,397 B2 | 3/2020 | Gostev et al. | |
| 10,784,993 B1* | 9/2020 | Batra | H04L 1/1887 |
| 11,304,042 B1* | 4/2022 | Ramakrishnan | H04B 1/7143 |
| 2005/0187001 A1 | 8/2005 | Fishel | |
| 2006/0194600 A1 | 8/2006 | Palin et al. | |
| 2009/0161602 A1* | 6/2009 | Matsumoto | H04W 72/1242 |
| | | | 370/328 |
| 2012/0302285 A1 | 11/2012 | Khairmode et al. | |
| 2013/0102251 A1 | 4/2013 | Linde et al. | |
| 2013/0182798 A1* | 7/2013 | Lozano | H04L 65/1089 |
| | | | 375/340 |
| 2013/0295987 A1 | 11/2013 | Khairmode et al. | |
| 2014/0348327 A1 | 11/2014 | Linde et al. | |
| 2018/0027033 A1 | 1/2018 | Kamstrup | |
| 2018/0084456 A1 | 3/2018 | Gostev et al. | |
| 2019/0159285 A1 | 5/2019 | Li et al. | |
| 2020/0146097 A1* | 5/2020 | Haartsen | G10L 25/84 |
| 2020/0205031 A1 | 6/2020 | Gostev et al. | |
| 2020/0252162 A1* | 8/2020 | Denboer | H04L 1/08 |
| 2020/0329052 A1* | 10/2020 | Goyal | H04W 12/106 |
| 2020/0336958 A1* | 10/2020 | Sridhara | H04W 36/03 |

* cited by examiner

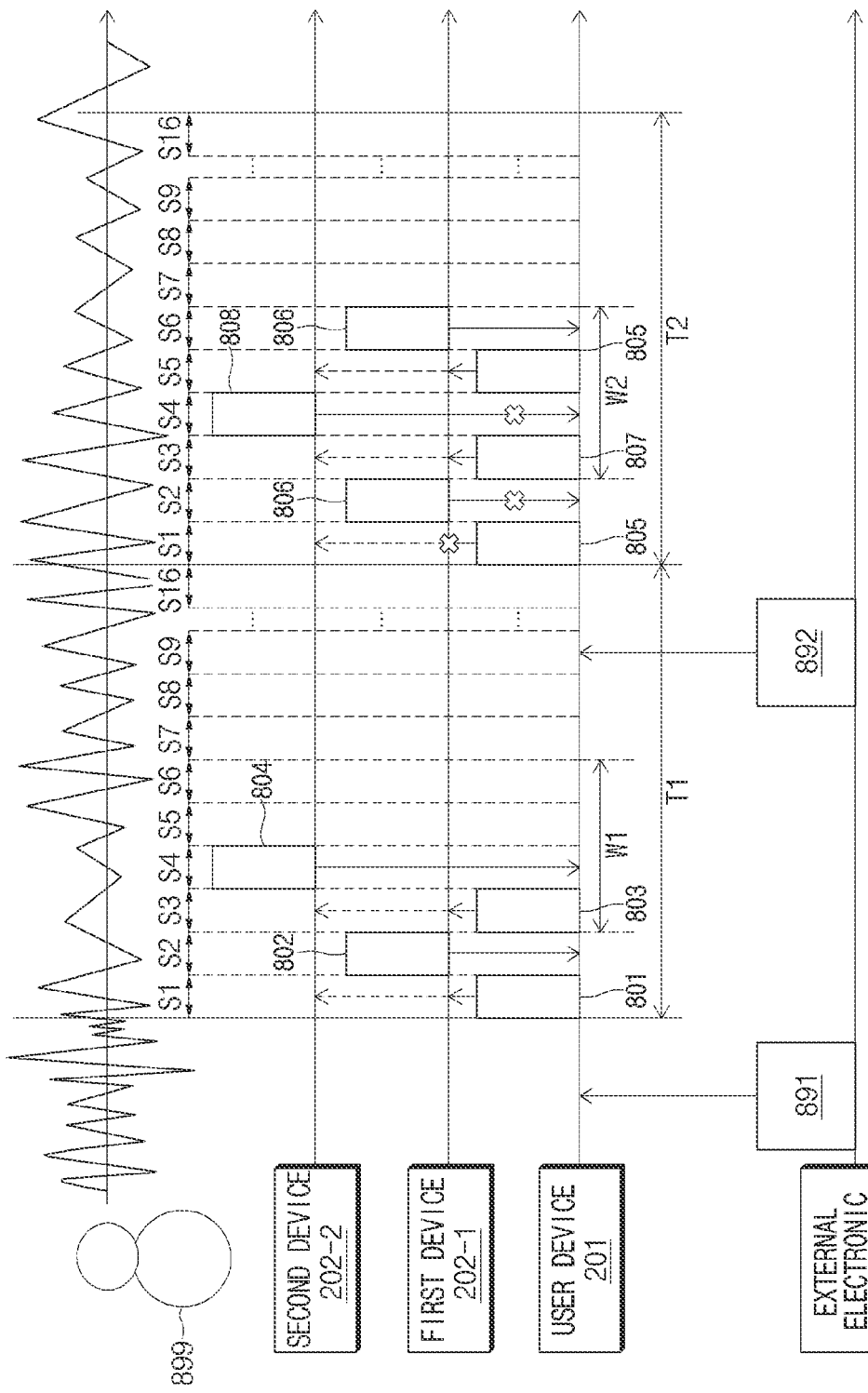

METHOD FOR TRANSCEIVING DATA IN BLUETOOTH NETWORK ENVIRONMENT AND ELECTRONIC DEVICE THEREOF

CROSS-REFERENCE TO RELATED APPLICATION

This application is based on and claims priority under 35 U.S.C. § 119 to Korean Patent Application No. 10-2019-0180086, filed on Dec. 31, 2019, and Korean Patent Application No. 10-2020-0184365, filed on Dec. 28, 2020 in the Korean Intellectual Property Office the disclosures of which are incorporated by reference herein in its entirety.

BACKGROUND

Field

The disclosure relates to a method for transceiving data in a Bluetooth environment and an electronic device therefor.

Description of Related Art

A Bluetooth technology standard stipulated by the Bluetooth Special Interest Group (SIG) defines a protocol for short range wireless communication between electronic devices. In a Bluetooth network environment, electronic devices may transmit or receive data packets including content such as a text, voice, image, or video at a specified frequency band (e.g., about 2.4 gigahertz (GHz)).

For example, user equipment (UE) such as a smartphone, tablet, desktop computer, or laptop computer may transmit data packets to another user equipment or accessory device. The accessory device may include at least one of an earphone, a headset, a speaker, a mouse, a keyboard, or a display device.

In a Bluetooth network environment, an electronic device and an external electronic device may exchange audio data in real time. For example, the electronic device and the external electronic device may exchange audio data based on a hands-free profile (HFP). In the HFP, the electronic device and the external electronic device may exchange audio data at a specified period.

A topology representing a Bluetooth network environment may include one user device (e.g., a device under test (DUT)) that transmits data packets and one or more devices that receive data packets from the user device. For example, when an earphone (or headset) is connected to a smartphone, the earphone may receive data packets from the smartphone.

For example, the user device may obtain audio data from an earphone including at least one microphone. While performing a call with an external electronic device, the user device may transmit the audio data obtained from the earphone to the external electronic device. Since the earphone is worn on a user's ear, the earphone may be apart from a user's mouth. Due to the distance between the mouth and the earphone, the quality of the audio data obtained by the earphone may deteriorate.

SUMMARY

Embodiments of the disclosure may provide an electronic device and a method for transceiving data using a retransmission window in a Bluetooth network environment.

An example embodiment of the disclosure provides an electronic device including: a first communication circuit configured to support wireless communication, a second communication circuit configured to support Bluetooth communication, a processor operatively connected to the first communication circuit and the second communication circuit, and a memory operatively connected to the processor, wherein the memory stores one or more instructions that, when executed, cause the processor to control the electronic device to: create a link with a first device based on a synchronous connection supporting protocol using the second communication circuit, transmit first data via the link on a first time slot among a plurality of time slots of one transmission/reception period of the link, receive, from the first device via the link, second data including audio data obtained by the first device on a second time slot among the plurality of time slots, receive third data including additional data for the second data within a retransmission window configured for data retransmission among the plurality of time slots, and transmit audio data generated based on the second data and the third data to an external electronic device using the first communication circuit.

Another example embodiment of the disclosure provides an electronic device including: an audio reception circuit connected to at least one microphone, a wireless communication circuit configured to support Bluetooth communication, a processor operatively connected to the audio reception circuit and the wireless communication circuit, and a memory operatively connected to the processor, wherein the memory stores one or more instructions that, when executed, cause the processor to control the electronic device to: connect to a first external electronic device via a first link using the wireless communication circuit, connect to a second external electronic device via a second link using the wireless communication circuit, transmit first link information including channel information about the first link to the second external electronic device via the second link, create an extended synchronous connection oriented (eSCO) link with the first electronic device via the first link, receive, from the first external electronic device, first data on a first time slot among a plurality of time slots of one transmission/reception period of the eSCO link, transmit, to the first external electronic device, second data including audio data obtained using the audio reception circuit on a second time slot among the plurality of time slots, and transmit additional data for enhancing sound quality of the audio data in a retransmission window configured for data retransmission among the plurality of time slots.

Another example embodiment of the disclosure provides a method for audio data transmission in an electronic device, including: creating an extended synchronous connection oriented (eSCO) link with a first device via a first link, transmitting first data in a first time slot among a plurality of time slots of one transmission/reception interval of the eSCO link, receiving second data from the first device on a second time slot among the plurality of time slots, attempting to receive third data within at least one retransmission time slot among the plurality of time slots, and transmitting audio data generated based on the second data and the third data to an external electronic device upon receiving the third data within the at least one retransmission time slot.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 8B is a diagram illustrating example packet exchange by transmitting additional data according to various embodiments;

With respect to the description of the drawings, the same or similar reference signs may be used for the same or similar elements.

DETAILED DESCRIPTION

Hereinafter, various example embodiments of the present disclosure will be described in greater detail with reference to the accompanying drawings. However, it should be understood that the present disclosure is not limited to specific embodiments, but rather includes various modifications, equivalents and/or alternatives of various embodiments of the present disclosure.

Figure 1:
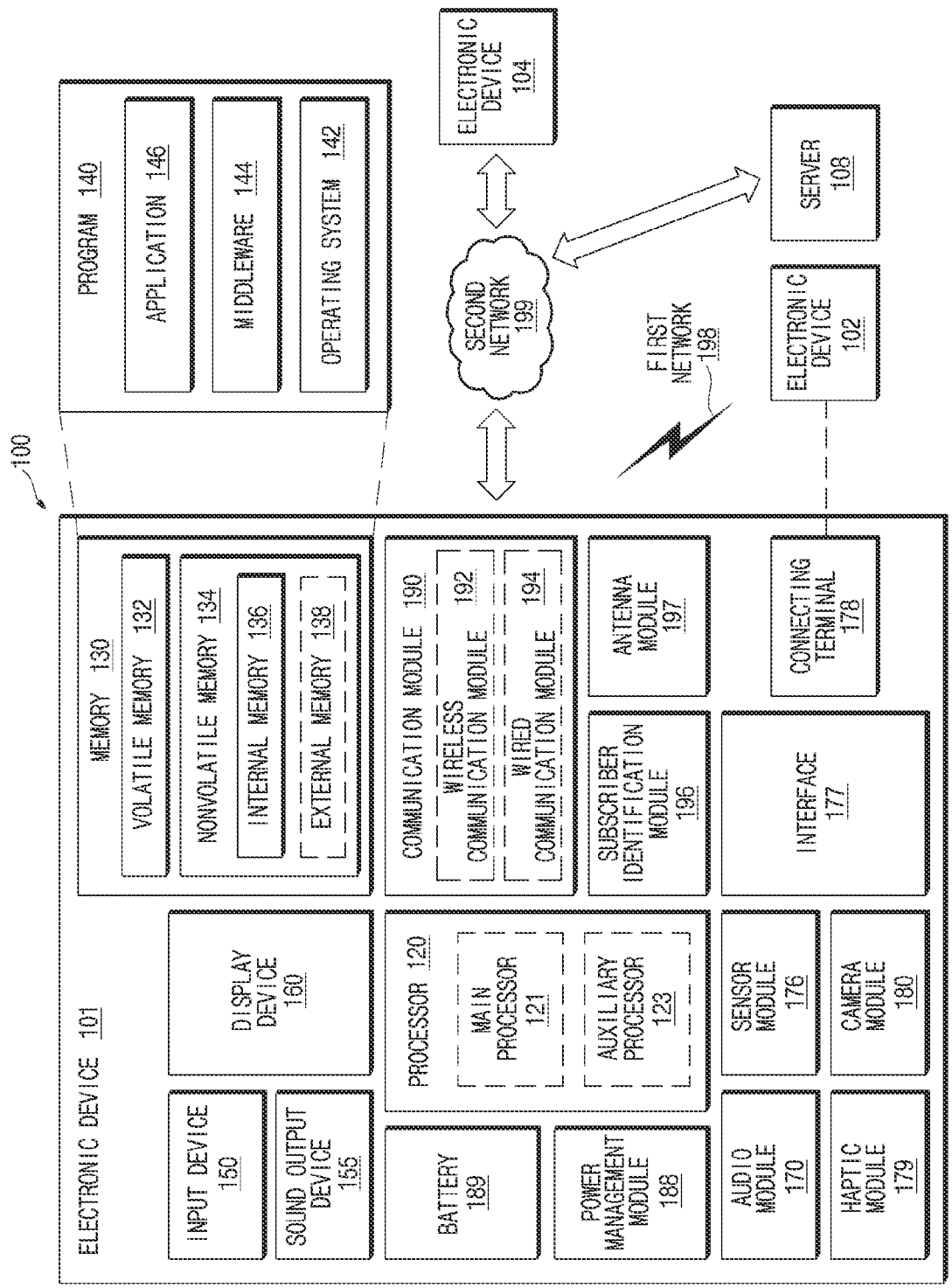
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
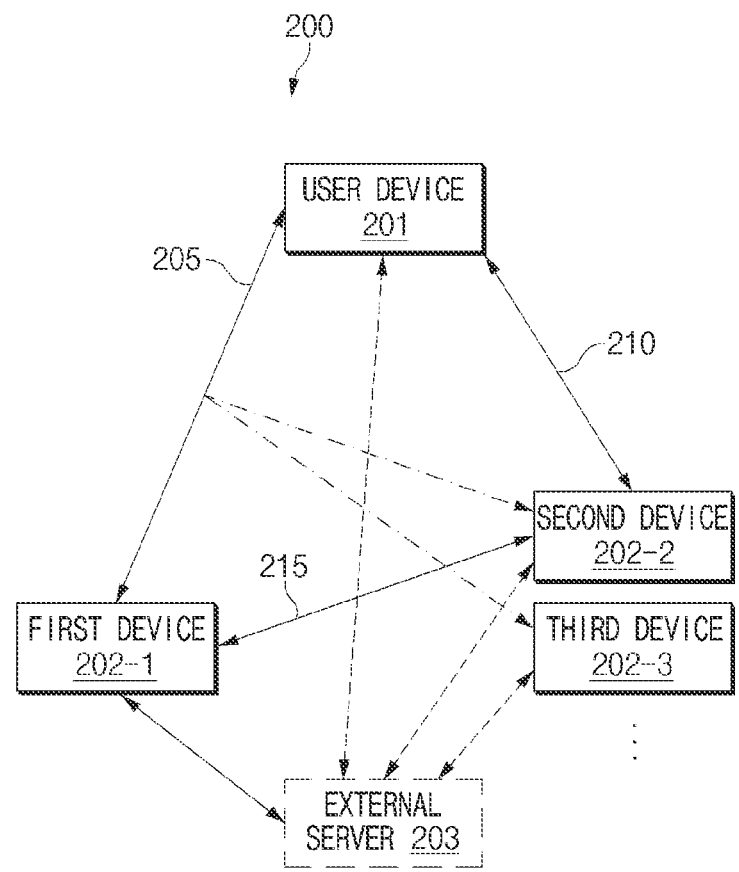
FIG. 2 is a diagram illustrating an example topology in a Bluetooth network environment according to various embodiments.

FIG. 2 is a diagram illustrating an example topology 200 of a Bluetooth network environment according to various embodiments.

Referring to FIG. 2, the electronic device 201 and one or more devices 202-1, 202-2, and/or 202-3 included in the topology 200 may include components, at least some of which are the same as or similar to those of the electronic device 101 illustrated in FIG. 1, and may execute functions, at least some of which are the same as or similar to those of the electronic device 101. For example, the user device 201 and the one or more devices 202-1, 202-2, and/or 202-3 may perform wireless communication at a short range according to a Bluetooth network defined by the Bluetooth SIG. The Bluetooth network may include, for example, a Bluetooth legacy network or a Bluetooth low energy (BLE) network. According to an embodiment, the user device 201 and the one or more devices 202-1, 202-2, and/or 202-3 may perform wireless communication via one or both of the Bluetooth legacy network and the BLE network.

The user device 201 may include, for example, a user equipment such as a smartphone, a tablet, a desktop computer, a laptop computer, or the like, and the one or more devices 202-1, 202-2, and/or 202-3 may include an accessory device such as an earphone, a headset, a speaker, a mouse, a keyboard, a display device, or the like. According to an embodiment, the one or more devices 202-1, 202-2, and/or 202-3 of FIG. 2 may recognize another device (e.g., a first device 202-1, a second device 202-2, and/or a third device 202-3) before connection or may store information (e.g., address information) about another device before connection. For example, in the case of an accessory device (e.g., an earphone) including the first device 202-1 and the second device 202-2, the first device 202-1 and the second device 202-2 may recognize each other or may store address information of each other before connection. According to an embodiment, the user device 201 and the one or more devices 202-1, 202-2, and/or 202-3 may be configured to update address information of each other. For example, the first device 202-1 may update the address information of the second device 202-2 store in a memory, or the second device 202-2 may update the address information of the first device 202-1 stored in a memory.

According to an embodiment, the user device 201 may serve as a master device, and the one or more devices 202-1, 202-2, and/or 202-3 may serve as slave devices. The number of devices serving as a slave device is not limited to the example illustrated in FIG. 2. According to an embodiment, during an operation in which a link (e.g., 205, 210, and/or 215) between devices are created, it may be determined which device should serve as a master device or a slave device. According to an embodiment, one of the first device 202-1 and the second device 202-2 (e.g., the first device 202-1) may serve as a master device, and the other device (e.g., the second device 202-2) may serve as a slave device.

The master device may control a physical channel. For example, the master device may transmit a data packet, whereas the slave device may transmit a data packet to the master device only after receiving a data packet. For another example, a channel resource (e.g., frequency hopping channel) for transmitting a data packet may be generated based on a clock of the master device. In the Bluetooth legacy network, a time resource (e.g., time slot) may be determined based on a clock of the master device. The time slot may be, for example, 625 μs (microseconds). In the BLE network, the master device and the slave device may transmit data packets at every specified interval, and, if data packets are received, may respond after a specified time (e.g., the inter frame space (T_IFS), about 150 μs).

According to an embodiment, the user device 201 may transmit a data packet including content such as text, audio, image, or video to the one or more devices 202-1, 202-2, and/or 202-3. Not only the user device 201 but also at least one of the devices 202-1, 202-2, and/or 202-3 may transmit a data packet according to the type of content included in a data packet. For example, only the user device 201 may transmit a data packet including content via a created link to the devices 202-1, 202-2, and/or 202-3 when music is played back on the user device 201, whereas, not only the user device 201 but also at least one of the devices 202-1, 202-2, and/or 202-3 may transmit a data packet including content (e.g., audio data) via a created link to the user device 201 when a call is performed on the user device 201. When only the user device 201 transmits a data packet, the user device 201 may be referred to as a source device, and the one or more devices 202-1, 202-2, and/or 202-3 may be referred to as a sink device.

When the user device 201 creates (or establishes) a plurality of links with the one or more devices 202-1, 202-2, and/or 202-3 in order to transmit a data packet, the resource consumption and/or power consumption of the user device 201 may increase. Therefore, the user device 201 may form only a first link 205 with the first device 202-1, and may transmit a data packet to the first device 202-1 via the first link 205. In this case, at least one of other devices (e.g., the second device 202-2 and/or third device 202-3) may monitor the first link 205 in order to receive a data packet including content transmitted from the user device 201. In this case, the user device 201 may be referred to as a device under test (DUT), the first device 202-1 may be referred to as a primary earbud or primary equipment (PE), and the at least one of other devices (e.g., the second device 202-2 and/or third device 202-3) may be referred to a secondary earbud or secondary equipment (SE).

According to an embodiment, the first device 202-1 may create a third link 215 with the second device 202-2. The first device 202-1 may transmit information associated with the first link 205 to the second device 202-2 via the third link 215 such that the second device 202-2 may monitor the first link 205 and may transmit a response message to the user device 201. Hereinafter, the term "monitoring" may refer, for example, to a state of attempting to receive at least a portion of packets transmitted via a corresponding link or a state capable of receiving at least a portion of packets. For example, when the second device 202-2 monitors the first link 205, the second device 202-2 may receive or attempt to receive at least a portion of packets transmitted by the user device 201 or the first device 202-1 (e.g., electronic devices forming the first link 205) via the first link 205. In this case, the user device 201 may recognize the second device 202-2 using the second link 210, but may not recognize the presence of the second device 202-2 via the first link 205. The information associated with the first link 205 may include address information (e.g., the Bluetooth address of the master device of the first link 205, the Bluetooth address of the user device 201, and/or the Bluetooth address of the first device 202-1), piconet (e.g., topology 200) clock information (e.g., clock native (CLKN) of the master device of the first link 205), logical transport (LT) address information (e.g., information allocated by the master device of the first link 205), used channel map information, link key information, service discovery protocol (SDP) information (e.g., service and/or profile information associated with the first link 205), and/or supported feature information. The information associated with the first link 205 may further include, for example, an extended inquiry response (EIR) packet. The EIR packet may include resource control information about the first link 205 and/or information about a manufacturer. The second device 202-2 may determine a hopping channel (or frequency hopping channel) of the first link 205 through address information and clock information, and may decrypt an encrypted data packet through the link key information. The second device 202-2 may generate an access code (or channel access code) and address information (e.g., LT address information) corresponding to the first link 205 based on the information associated with the first link 205, and may transmit a response message including the generated access code and address information to the user device 201. In this case, the user device 201 may determine whether to retransmit a data packet based on the response message transmitted from the second device 202-2 even if a link with the second device 202-2 is not created.

According to an embodiment, if the first device 202-1 and the second device 202-2 are devices that support the same user account or a similar user account (e.g., a family account), the first device 202-1 and the second device 202-2 may share the information associated with the first link 205 through an external device (e.g., an external server 203) interworking with the first device 202-1 or the second device 202-2 through the same or similar user account. The topology 200 may further include, for example, the external server 203. In an embodiment, the third device 202-3 may also be a device that supports the same user account as or similar account (e.g., family account) to that of the first device 202-1. For example, the first device 202-1 may transmit the information associated with the first link 205 to the external server 203, and the external server 203 may transmit the information associated with the first link 205 to the second device 202-2 and/or the third device 202-3. When a request is received, for example, from the second device 202-2 and/or the third device 202-3, the external server 203 may transmit information (e.g., the information associated with the first link 205) received from the first device 202-1 and/or the user device 201 to the second device 202-2 and/or the third device 202-3. When the request is received from the second device 202-2 and/or the third device 202-3, the external server 203 may request the first device 202-1 and/or the user device 201 to transmit the information associated with the first link 205, and may receive the information associated with the first link 205 from the first device 202-1 and/or the user device 201. When the request is received from the second device 202-2 and/or the third device 202-3, the external server 203 may transmit the information associated with the first link 205, which is stored in the external server 203, to the second device 202-2 and/or the third device 202-3.

According to an embodiment, the second device 202-2 may share the information associated with the first link 205 with the user device 201. For example, the user device 201 may transmit the information associated with the first link 205 to the second device 202-2 via the second link 210. For example, after transmitting the information associated with the first link 205, the user device 201 may release the second link 210.

Figure 3:
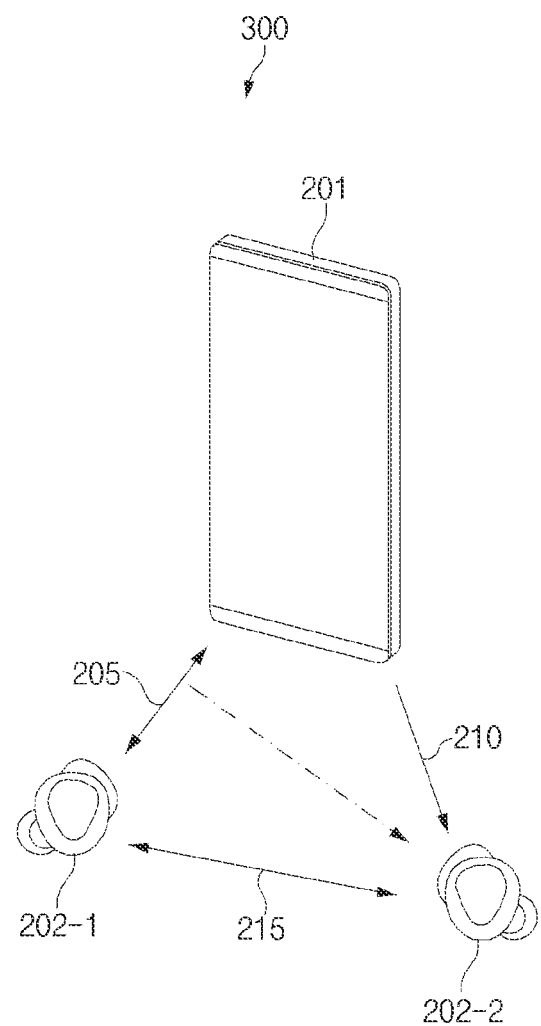
FIG. 3 is a diagram illustrating example electronic devices of a Bluetooth network according to various embodiments.

FIG. 3 is a diagram illustrating example electronic devices of a Bluetooth network 300 according to various embodiments.

According to an embodiment, the user device 201 may create the first link 205 with the first device 202-1, and may create the second link 210 with the second device 202-2. According to an embodiment, the first device 202-1 and the second device 202-2 may create the third link 215. According to an embodiment, the second device 202-2 may monitor the first link 205 by receiving the information associated with the first link 205 from the first device 202-1 via the third link 215. For example, the second device 202-2 may obtain audio data exchanged between the user device 201 and the first device 202-1 by monitoring the first link 205.

Referring to FIG. 3, for example, the user device 201 may be a portable electronic device (e.g., a smartphone). For example, the first device 202-1 and/or the second device 202-2 may be a wireless earphone or wireless earbud. For example, the user device 201 may transmit audio data to the first device 202-1 via the first link 205. The first device 202-1 and the second device 202-2 may be configured to output the audio data received from the user device 201 via the first link 205. For another example, when performing a voice call, the first device 202-1 and/or the second device 202-2 may receive audio data from the user device 201, and may transmit the obtained audio data to the user device 201 via a microphone (not shown) of the first device 202-1 and/or the second device 202-2.

In the example of FIG. 3, the user device 201 may obtain audio data from the first device 202-1 and/or the second device 202-2. For example, the user device 201 may perform a call (e.g., a voice call or video call) with an external electronic device (not shown). In this case, the user device 201 may obtain audio data to perform a call. For another example, the user device 201 may obtain audio data in response to execution of a specified application (e.g., voice chatting, messenger, voice assistant, or voice recording).

In an embodiment, the user device 201 may obtain audio data based on a synchronous connection protocol. For example, the synchronous connection protocol may include a protocol (e.g., protocol that supports HFP) that supports real-time audio data exchange. The user device 201 may create a synchronous connection in order to exchange audio data in real time. The user device 201 may create a link for exchanging audio data in real time with the first device 202-1 via the first link 205. For example, the user device 201 may create a synchronous connection oriented (SCO) link or extended SCO (eSCO) link via the first link 205.

In an embodiment, the user device 201 may create the eSCO link with the first device 202-1. When creating the eSCO link, the user device 201 and the first device 202-1 may negotiate various parameters associated with the eSCO link. For example, the parameters associated with the eSCO link may include a transmission/reception period (e.g., interval eSCO (TeSCO)), retransmission window (retransmit window eSCO (WeSCO)), and/or packet type.

For another example, the user device 201 may create a first eSCO link with the first device 202-1 via the first link 205, and may create a second eSCO link with the second device 202-2 via the second link 210. The first device 202-1 and the second device 202-2 may negotiate, via the third link 215, parameters (e.g., TeSCO, WeSCO, and/or packet type) to be used in the first eSCO link via the first link 205 and the second eSCO link via the second link 210. The first device 202-1 and the second device 202-2 may negotiate with the user device 201 so that the parameters negotiated via the third link 215 may be used in the first eSCO link and the second eSCO link. For another example, the user device 201 may select a parameter to be used in the first eSCO link and the second eSCO link, and may notify the selected parameter to the first device 202-1 and the second device 202-2.

According to an embodiment, the transmission/reception period TeSCO may include information about a time period at which the user device 201 and the first device 202-1 exchange data. For example, the transmission/reception period may include a plurality of time slots. In the case of the eSCO link, the transmission/reception period may be configured so that a master device (e.g., the user device 201) and slave device (e.g., the first device 202-1) of the eSCO link may exchange data within a time corresponding to one TeSCO. For example, the transmission/reception period may be configured so that a first slot of the transmission/reception period is used for data transmission of the master device, and a second slot is used for data transmission of the slave device. For another example, the transmission/reception period may be configured so that first N number of slots (e.g., N is 1 or 3) of the transmission/reception period are used for data transmission of the master device, and a slot following the N number of slots is used for data transmission of the slave device.

The retransmission window WeSCO may include information (e.g., the number of slots) about a length of a time interval used for data retransmission within the transmission/reception period TeSCO. The retransmission window may include at least one time slot following a time slot for initial data transmission/reception of the master device and the slave device within one transmission/reception period. For example, when the master device and the slave device use first and second time slots of the transmission/reception period, the retransmission window may start from a third time slot. If data including NACK is received or data including ACK is not received from the slave device in response to data transmitted from the master device to the slave device, the master device may attempt to retransmit data using a time slot configured for the master device within the WeSCO. For another example, the slave device may also attempt to retransmit data using a time slot configured to the slave device within the WeSCO. When re-reception of data fails within the WeSCO, the master device and the slave device may be configured to attempt to exchange new data rather than to retransmit existing data at a next transmission/reception period.

The packet type may include information about various packets for audio transfer. In the case of the eSCO link, evolution (EV)-type packets (e.g., EV3, EV4, EV5, 2-EV3, 2-EV5, 3-EV3, 3-EV5) may be used. For example, parameters of the eSCO link according to a packet type are shown in Table 1. In the following table, 10 TeSCO/2 may indicate that when TeSCO is 12 slots, a master-slave packet length is 10*12/2, for example, 60 bytes.

TABLE 1

|  | Single-slot packet | 3-Slot packet |
| --- | --- | --- |
| TeSCO (slots) | EV3: 6<br>2-EV3: 6-12 (even)<br>3-EV3: 6-18 (even) | EV4: 16<br>EV5: 16<br>2-EV5: 16<br>3-EV5: 16 |
| WeSCO (slots) | 0, 2, 4 | 0, 6 |
| Master-slave packet length (Bytes) | 10TeSCO/2 | 10TeSCO/2 |
| Slave-master packet length (Bytes) | 10TeSCO/2 | 10TeSCO/2 |

In the example of FIG. 3, the user device 201 may obtain a user's voice from the first device 202-1 and the second device 202-2. Various methods may be considered in order to improve sound quality of a user's voice. For example, the first device 202-1 and/or the second device 202-2 may generate audio data by enhancing audio data obtained by the first device 202-1 and/or the second device 202-2, and may transmit the generated audio data to the user device 201. For another example, when the first device 202-1 or the second device 202-2 is unable to generate and transmit enhanced audio data due to limited performance (e.g., limited resource, memory, or calculation capacity), the first device 202-1 and/or the second device 202-2 may transmit additional data for audio enhancement (e.g., noise removal, noise suppression, data reconstruction using multi-channel data, and/or signal-to-noise (SNR) improvement) to the user device 201 so as to enhance audio data by the user device 201. However, in the case of the eSCO link, since only limited slots are used for data transmission, and the following slots are configured as slots for retransmission, the first device 202-1 and/or the second device 202-2 may be unable to transmit additional data. Furthermore, since a radio resource of the first link 205 is used by the first device 202-1 in a network topology in which the second device 202-2 monitors the first link 205, data of the second device 202-2 may be unable to be transmitted to the user device 201. In addition, when both the first device 202-1 and the second device 202-2 perform transmission, both the first device 202-1 and the second device 202-2 may repeat retransmission in a retransmission window when data transmission fails, thus causing an increase in power consumption of the first device 202-1 and the second device 202-2.

Hereinafter, various example embodiments of the present disclosure will be described with reference to FIGS. 4, 5, 6, 7, 8A, 8B, 9, 10, 11, 12, 13, 14, 15, 16 and 17. In the following descriptions, the user device 201, the first device 202-1, and/or the second device 202-2 may exchange data in a retransmission window within a transmission/reception period. The user device 201, the first device 202-1, and/or the second device 202-2 may enhance audio data using data received in a retransmission window.

Figure 4:
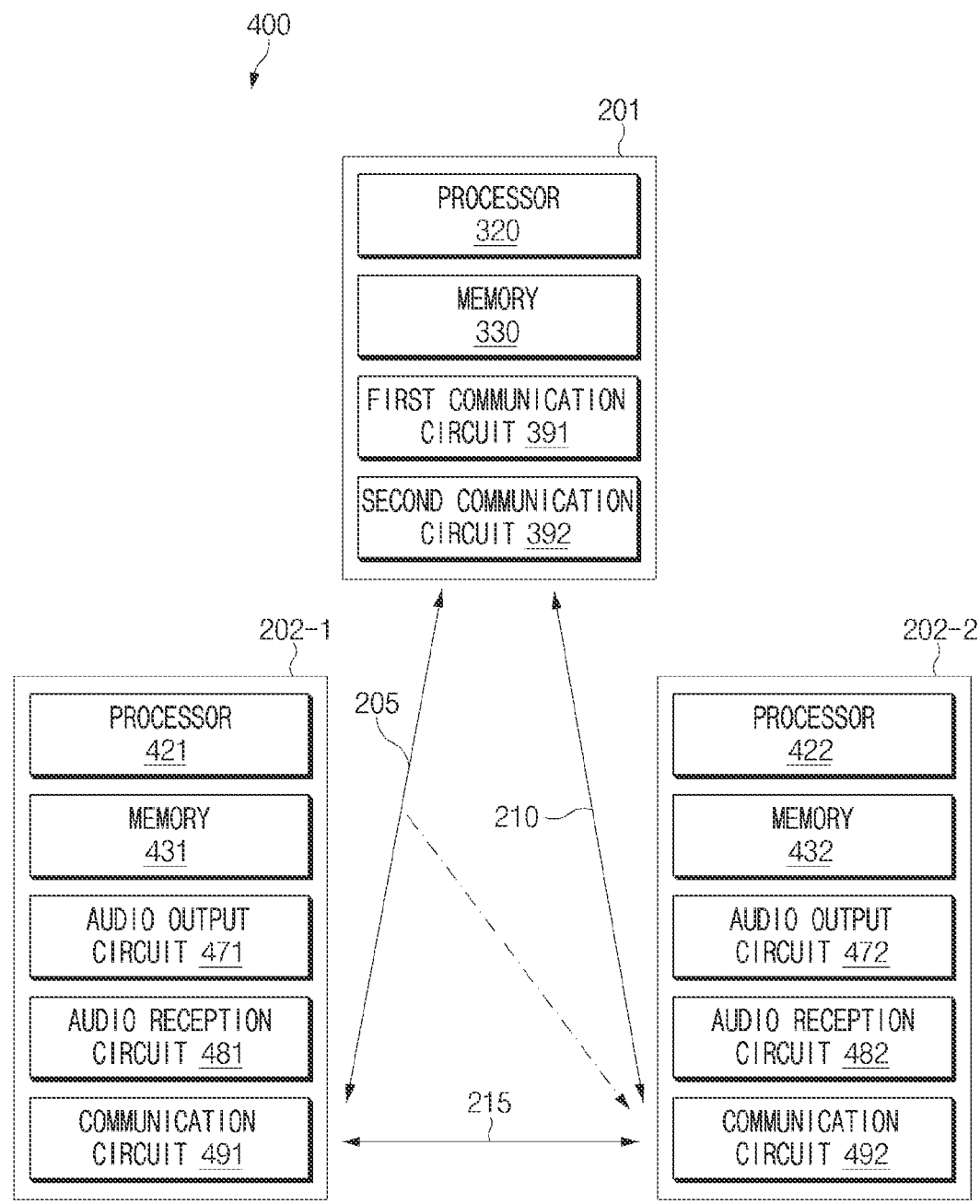
FIG. 4 is a block diagram illustrating example electronic devices according various embodiments.

FIG. 4 is a block diagram illustrating example electronic devices according to various embodiments.

According to various embodiments, various electronic devices (e.g., the user device 201, the first device 202-1, and the second device 202-2) disclosed in the present disclosure may include at least some of the components of the electronic device (e.g., the electronic device 101 of FIG. 1) described above with reference to FIG. 1.

According to various embodiments, the user device 201 may include a processor (e.g., including processing circuitry) 320 (e.g., the processor 120 of FIG. 1), a memory 330 (e.g., the memory 130 of FIG. 1), a first communication circuit 391 (e.g., the communication module 190 of FIG. 1), and/or a second communication circuit 392 (e.g., the communication module 190 of FIG. 1). The processor 320 may be operatively connected to the first communication circuit 391, the second communication circuit 392, and the memory 330. The memory 330 may store one or more instructions that, when executed, cause the processor 320 to perform various operations of the user device 201. The second communication circuit 392 may be configured to support wireless communication based on a Bluetooth protocol (e.g., legacy Bluetooth and/or BLE). The first communication circuit 391 may be configured to support communication based on a wireless communication standard (e.g., cellular and/or WiFi) except for a Bluetooth protocol. The user device 201 may further include a configuration not illustrated in FIG. 4. For example, the user device 201 may further include a display (e.g., the display device 160 of FIG. 1), an audio input/output device (e.g., the audio module 170 of FIG. 1), and/or a housing.

The user device 201 may be connected to the first device 202-1 via the first link 205. For example, the user device 201 and the first device 202-1 may communicate on a time slot by time slot basis, the time slot being configured based on a clock of the master device of the first link 205. For example, one time slot may be configured so that the master device may transmit data to the slave device or the slave device may transmit data to the master device. For example, one time slot may have a length of 625 μs (microseconds).

The user device 201 may transmit a data packet via the first link 205. For example, the user device 201 may transmit audio data using a synchronous connection oriented (SCO) or extended SCO (eSCO) scheme.

The user device 201 may receive a response message for transmitted data via the first link 205. For example, the user device 201 may receive a response message transmitted from the first device 202-1 via the first link 205. The user device 201 may receive a response message transmitted from the second device 202-2 via the first link 205. For example, the user device 201 may receive, via the first link 205, a response message transmitted by the second device 202-2 using information about the first device 202-1. According to an embodiment, when the response message indicates negative acknowledgement (NACK) or the response message is not received within a specified time (e.g., a time slot allocated to the first device 202-1 within a transmission/reception period) after transmitting data, the user device 201 may retransmit data via the first link 205. A value of an automatic repeat request number (ARQN) field of a header of a packet indicating negative acknowledgement may be set to 0. For example, the user device 201 may retransmit data within a retransmission window of the first link 205.

According to an embodiment, the user device 201 may be connected to the second device 202-2 via the second link 210. For example, the user device 201 may establish the second link 210 after connecting to the first device 202-1. As described above with reference to FIGS. 2 and 3, the user device 201 may transfer the information associated with the first link 205 to the second device 202-2 via the second link 210. According to an embodiment, the second link 210 may be omitted. In this case, the second device 202-2 may receive the information associated with the first link 205 from the first device 202-1 or an external server (e.g., the external server 203 of FIG. 2).

According to an embodiment, the first device 202-1 may include a processor (e.g., including processing circuitry) 421 (e.g., the processor 120 of FIG. 1), a memory 431 (e.g., the memory 130 of FIG. 1), an audio output circuit 471 (e.g., the audio module 170 of FIG. 1), an audio reception circuit 481 (e.g., the audio module 170 of FIG. 1), and/or a communication circuit 491 (e.g., the communication module 190 of FIG. 1). The processor 421 may be operatively connected to the communication circuit 491, the audio output circuit 471, the audio reception circuit 481, and the memory 431. The audio output circuit 471 may be configured to output a sound. The audio reception circuit 481 may include one or more microphones. In an embodiment, the microphones may correspond to different audio reception paths. For example, in the case where the audio reception circuit 481 includes a first microphone and a second microphone, an audio signal obtained by the first microphone and an audio signal obtained by the second microphone may be referred to as different audio channels. The processor 421 may obtain audio data using at least one microphone among a plurality of microphones connected to the audio reception circuit 481. The processor 421, for example, may dynamically select or determine at least one microphone for obtaining audio data among the plurality of microphones. The processor 421 may obtain audio data by performing beamforming using the plurality of microphones. The memory 431 may store one or more instructions that, when execute, cause the processor 421 to perform various operations of the first device 202-1. The first device 202-1 may further include a configuration not illustrated in FIG. 4. For example, the first device 202-1 may further include an indicator (e.g., the display device 160 of FIG. 1), an input interface (e.g., the interface 177 of FIG. 1), and/or a housing. For another example, the first device 202-1 may further include a sensor (e.g., a proximity sensor and/or a pulse sensor) (e.g., the sensor module 176 of FIG. 1)) configured to detect whether or not the first device 202-1 is worn.

The first device 202-1 may be connected to the user device 201 via the first link 205. For example, the user device 201 and the first device 202-1 may communicate on a time slot by time slot basis, the time slot being configured based on a clock of the master device of the first link 205. For example, one time slot may be configured so that the master device may transmit data to the slave device or the slave device may transmit data to the master device. For example, one time slot may have a length of 625 μs (microseconds).

The first device 202-1 may receive a data packet from the user device 201 via the first link 205. In an embodiment, the first device 202-1 may transmit a response message for the received data packet to the user device 201 via the first link 205. For example, the first device 202-1 may transmit a response message indicating ACK when data is received successfully, or may transmit response message indicating NACK when data reception fails. In an embodiment, the first device 202-1 may be configured to transmit a response message indicating NACK regardless of whether data is received in order to induce the user device 201 to retransmit. In an embodiment, the first device 202-1 may be configured to transmit a response message indicating NACK only when data reception fails, and not to transmit a response message when data is received successfully. According to an embodiment, a response message received from the first device 202-1 may include audio data obtained by the audio reception circuit 481.

According to an embodiment, the first device 202-1 may be connected to the second device 202-2 via the third link 215. For example, the first device 202-1 may establish the third link 215 with the second device 202-2. For example, a channel access code (CAC) of the first link 205 may be generated based on a low address part (LAP) of a Bluetooth address of the master device of the first link 205. The CAC may refer, for example, to an access code that is used, after a connection of an associated link is completed, for communication between two electronic devices (e.g., the user device 201 and the first device 202-1) of the link (e.g., the first link 205). The first device 202-1 may transmit the generated CAC and/or the Bluetooth address of the master device of the first link 205 to the second device 202-2 as at least a portion of first link information. In this case, the first device 202-1 may transmit the first link information to the second device 202-2 via the third link 215.

For example, LT_ADDR may be an address allocated by the master device of the first link 205. The first device 202-1 may transmit LT_ADDR to the second device 202-2 as at least a portion of the first link information.

For example, a used channel map may be channel hopping information configured by the master device of the first link 205. The first device 202-1 may transmit the used channel map to the second device 202-2 as at least a portion of the first link information.

For example, clock information may include clock information about the master device and/or slave device of the first link 205. The first device 202-1 may transmit the clock information to the second device 202-2 as at least a portion of the first link information.

According to various embodiments, the second device 202-2 may include a processor (e.g., including processing circuitry) 422 (e.g., the processor 120 of FIG. 1), a memory 432 (e.g., the memory 130 of FIG. 1), an audio output circuit 472 (e.g., the audio module 170 of FIG. 1), an audio reception circuit 482, and/or a communication circuit 492 (e.g., the communication module 190 of FIG. 1). The processor 422 may be operatively connected to the communication circuit 492, the audio output circuit 472, the audio reception circuit 482, and the memory 432. The audio output circuit 472 may be configured to output a sound. The audio reception circuit 482 may include one or more microphones.

In an embodiment, the microphones may correspond to different audio reception paths. For example, in the case where the audio reception circuit 482 includes a first microphone and a second microphone, an audio signal obtained by the first microphone and an audio signal obtained by the second microphone may be referred to as different audio channels. The memory 432 may store one or more instructions that, when execute, cause the processor 422 to perform various operations of the second device 202-2. The second device 202-2 may further include a configuration not illustrated in FIG. 4. For example, the second device 202-2 may further include an indicator (e.g., the display device 160 of FIG. 1), an audio input device (e.g., the audio module 170), an input interface (e.g., the interface 177 of FIG. 1), and/or a housing. For another example, the second device 202-2 may further include a sensor (e.g., a proximity sensor and/or a pulse sensor) configured to detect whether or not the second device 202-2 is worn.

According to an embodiment, the user device 201 may include the first communication circuit 391 supporting wireless communication, the second communication circuit 392 supporting Bluetooth communication, the processor 320 operatively connected to the first communication circuit 391 and the second communication circuit 392, and the memory 330 operatively connected to the processor 320. The memory 330 may store one or more instructions that, when executed, cause the processor 320 to perform the operations described below. For example, the processor 320 may create a link (e.g., the first link 205) with the first device 202-1 based on a synchronous connection protocol (e.g., eSCO) using the second communication circuit 392. For example, the synchronous connection protocol may be referred to as a protocol for transceiving audio data in real time. The processor 320 may transmit first data (e.g., data including first audio data or NULL data) to the first device 202-1 via the link on a first time slot among a plurality of time slots of one transmission/reception period of the link. The processor 320 may receive, via the link, second data (e.g., data including second audio data or NULL data) obtained by the first device 202-1 from the first device 202-1 on a second time slot among the plurality of time slots. The processor 320 may receive third data including additional data for the second data within a retransmission window configured for data retransmission among the plurality of time slots, and may transmit audio data generated based on the second data and the third data to an external electronic device using the first communication circuit 391.

When creating the link with the first device 202-1, the processor 320 may transmit, to the first device 202-1, information indicating whether the additional data is supported. For example, the information indicating whether the additional data is supported may be indicated by codec information used in audio data of the link.

The processor 320 may include various processing circuitry and be configured to control the user device 201 to retransmit the first data within the retransmission window if the second data is not received on the second time slot or the second data including negative acknowledgement is received.

For example, third audio data included in the third data may be audio data of an audio channel different from that of the second audio data included in the second data. The third data may be audio data obtained by the second device 202-2 different from the first device 202-1. The third audio data may be audio data of an interval that is different from that of the second audio data in a time domain.

According to an embodiment, the processor 320 may control the user device 201 to transmit additional data for enhancing sound quality of the first audio data to the first device 202-1 within the retransmission window.

According to an embodiment, the first device 202-1 may include the audio reception circuit 481 connected to at least one microphone, the communication circuit 491 configured to support Bluetooth communication, the processor 421 operatively connected to the audio reception circuit 481 and the communication circuit 491, and the memory 431 operatively connected to the processor 320. The memory 431 may store one or more instructions that, when executed, cause the processor 421 to control the device to perform the operations described below. The processor 421 may connect to the user device 201 via the first link 205 and connect to the second device 202-2 via the third link 215 using the communication circuit 491. The processor 421 may transmit the first link information including channel information about the first link 205 to the second device 202-2 via the third link 215. The processor 421 may create an eSCO link with the user device 201 based on a synchronous connection protocol through the first link 205. The processor 421 may receive first data from the user device 201 on a first time slot among a plurality of time slots of one transmission/reception period of the eSCO link, and may transmit second data (e.g., data including second audio data obtained using the audio reception circuit 481) on a second time slot among the plurality of time slots. The processor 421 may be configured to transmit third data (e.g., data including third audio data obtained using the audio reception circuit 481) including additional data for enhancing sound quality of the second data in a retransmission window configured for data retransmission among the plurality of time slots.

For example, the audio reception circuit 481 may be connected to a first microphone and a second microphone, the second audio data may be obtained through the first microphone, and the third audio data of the third data may be obtained through the second microphone. For example, the second audio data and the third audio data may be obtained in different time domains.

The processor 421 may transmit the additional data if audio codec information associated with the eSCO link corresponds to a specified codec, or may not transmit the additional data if the audio codec information associated with the eSCO link does not correspond to the specified codec.

The processor 421 may receive additional data for enhancing sound quality of the first audio data from the first external electronic device in the retransmission window.

Figure 5:
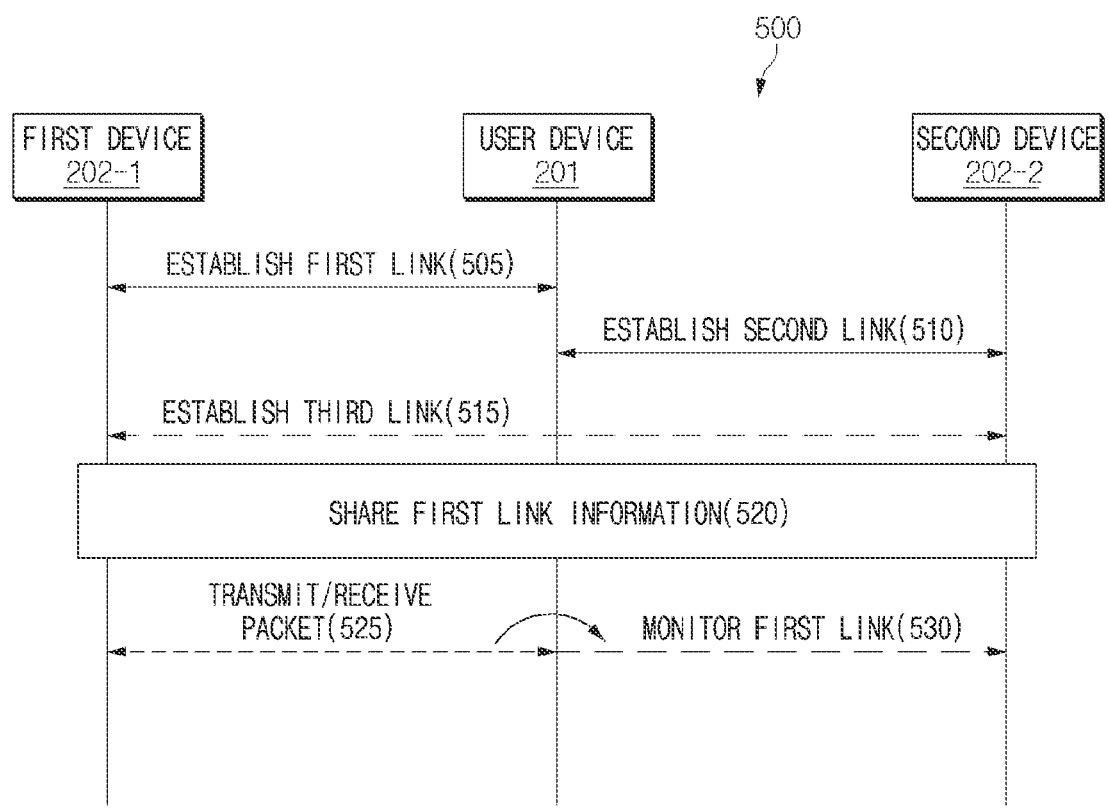
FIG. 5 is a signal flow diagram illustrating example communication between electronic devices according to various embodiments.

FIG. 5 is a signal flow diagram 500 illustrating example communication between electronic devices according to various embodiments.

Referring to FIG. 5, in operation 505, the user device 201 may establish a first link (e.g., the first link 205 of FIG. 2) with the first device 202-1. According to an embodiment, the user device 201 may be connected to the first device 202-1 via the first link 205.

In operation 510, the user device 201 may establish a second link (e.g., the second link 210 of FIG. 2) with the second device 202-2. According to an embodiment, the user device 201 may be connected to the second device 202-2 via the second link 210. The establishment of the second link 210 is an example, and embodiments of the present disclosure are not limited thereto. For example, the user device 201 and the second device 202-2 may establish the second link 210 before the establishment of the first link 205 (e.g., operation 505). For example, the second link 210 may be released after sharing first link information (e.g., operation 520). For another example, the establishment of the second link 210 (e.g., operation 510) may be skipped. For example, operation 505 may be performed based on input to the user device 201.

Figure 6:
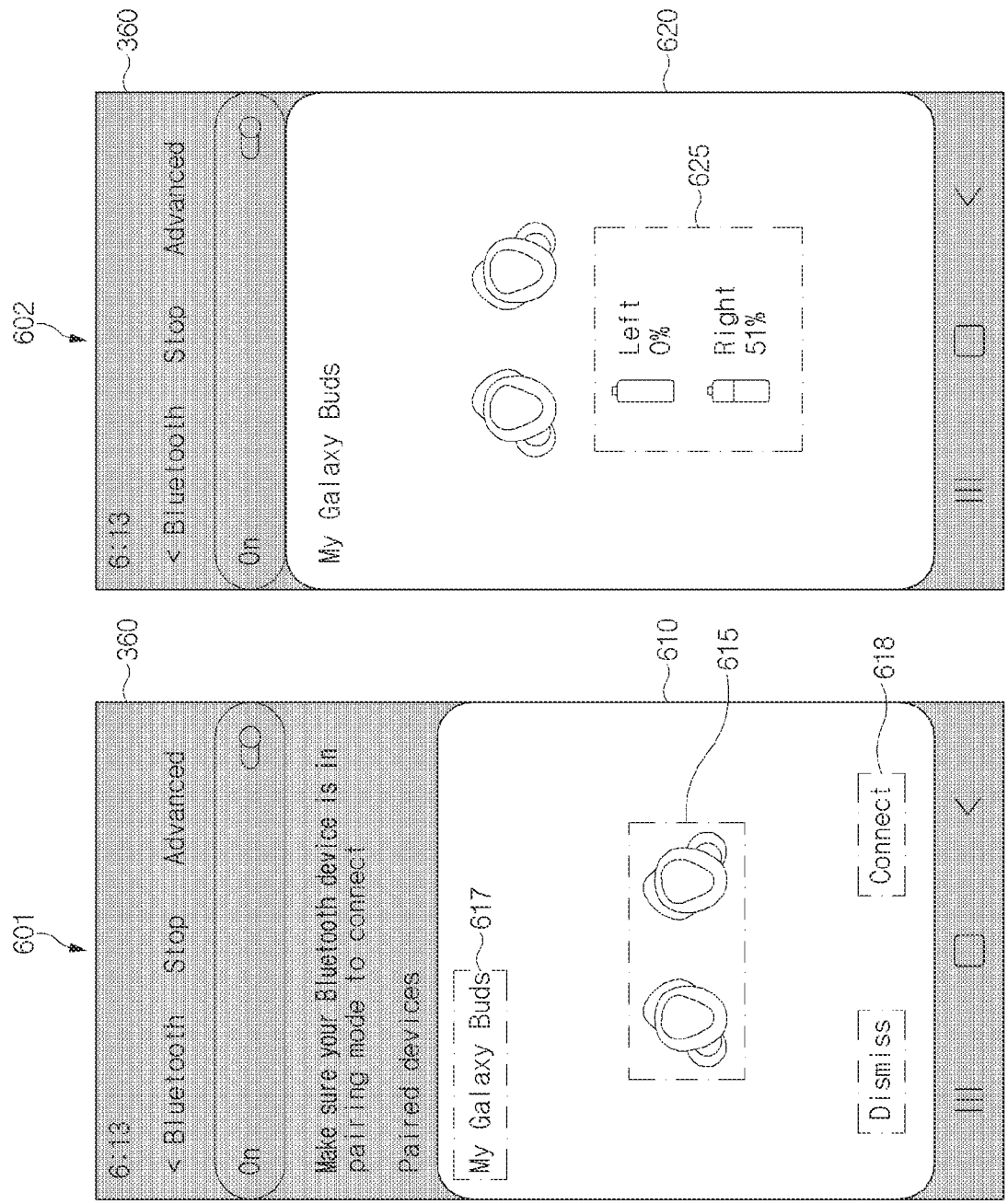
FIG. 6 is a diagram illustrating example user interfaces (UI) showing connections of devices in a Bluetooth network environment according to various embodiments.

FIG. 6 is a diagram illustrating example user interfaces (UI) showing connections of devices in the Bluetooth network environment according to various embodiments. FIG. 6 illustrates an embodiment in which the first device 202-1 and the second device 202-2 are configured as a set, but the same principle may be applied to user interface showing only that the user device 201 is connected with the first device 202-1.

Referring to FIG. 6, with regard to reference numeral 601, the user device 201 may recognize the first device 202-1 by receiving an advertising signal transmitted from the first device 202-1, and may output, through a display 360 of the user device 201, a first user interface 610 for notifying the recognized first device 202-1 and the second device 202-2 to a user. For example, the first device 202-1 and the second device 202-2 may include one set or one pair. The user of the user device 201 may recognize the first device 202-1 and the second device 202-2 as one electronic device.

The first user interface 610 may include, for example, at least one of an image 615 representing shapes of the first device 202-1 and the second device 202-2 or a text 617 indicating the device names (e.g., My Galaxy Buds) of the first device 202-1 and the second device 202-2. For another example, although not illustrated in FIG. 6, the first user interface 610 may indicate whether or not the first device 202-1 or the second device 202-2 has a history of being previously connected.

According to an embodiment, the advertising signal may include information for connecting (or pairing) the user device 201 and the first device 202-1. For example, the advertising signal may include at least one of identification information of the first device 202-1, user account information, current pairing information indicating whether or not the first device 202-1 is being paired with another device, a paring list indicating a list of devices with which the first device 202-1 has been previously paired, simultaneous pairing information indicating devices capable of pairing with the first device 202-1 simultaneously, transmission power, sensing area, or battery status information. For another example, if the first device 202-1 forms a set with the second device 202-2, the advertising signal may further include at least one of identification information of the second device 202-2, user account information, current pairing information indicating whether or not the second device 202-2 is being paired with another device, a paring list indicating a list of devices with which the second device 202-2 has been previously paired, simultaneous pairing information indicating devices capable of pairing with the second device 202-2 simultaneously, transmission power, sensing area, or battery status information. According to an embodiment, the first device 202-1 may transmit the advertising signal through a multicast method or a broadcast method.

According to an embodiment, the first device 202-1 may transmit the advertising signal according to a specified condition. For example, the first device 202-1 may transmit the advertising signal in response to detecting that the case in which the first device 202-1 is stored is opened. For another example, the first device 202-1 may transmit the advertising signal in response to supply of power or reception of a user input. For another example, the first device 202-1 may transmit the advertising signal every specified period.

According to an embodiment, the user device 201 may establish (e.g., operation 505 of FIG. 5) the first link (e.g., the first link 205 of FIG. 2) with the first device 202-1, in response to reception of a user input to a connection UI 618 requesting connection with the first device 202-1 or automatically without the user input. According to an embodiment, the user device 201 and the first device 202-1 may establish the first link 205 according to a procedure based on a Bluetooth standard. For example, the user device 201 and the first device 202-1 may perform a baseband page procedure for recognizing a counterpart device, a link manager protocol (LMP) procedure for identifying an LMP version, a clock offset, and/or supported functions (e.g., supported features), a host request/response procedure for verifying connection, an authentication procedure for confirming whether or not the counterpart device is trustable, an encryption procedure, and/or a setup complete procedure for notifying a host of completion of connection (e.g., the first link 205).

Once the first link 205 is established, as indicated by reference numeral 602, the user device 201 may output, through the display 360, a second user interface 620 indicating that the first device 202-1 is connected to the user device 201. The second user interface 620 may further include, for example, an image 625 showing battery statuses of the first device 202-1 and the second device 202-2. The second user interface 620 illustrated in FIG. 6 is an example, and embodiments of the present disclosure are not limited thereto. The image 625 of FIG. 6 may be, for example, an image integrally showing the battery status of the first device 202-1 and the second device 202-2 (e.g., an image including one battery shape and/or one battery numerical value). The second user interface 620 may further include battery information about a case of the first device 202-1 and the second device 202-2.

Although not illustrated in FIG. 6, according to an embodiment, if the first device 202-1 is discovered while the user device 201 is already connected to an external device other than the first device 202-1 and the second device 202-2, the user device 201 may transmit, to the first device 202-1 or the second device 202-2, information about a link that is already connected such that the first device 202-1 or the second device 202-2 may monitor the link that is already connected between the user device 201 and the external device. In this case, the first user interface 610 may include information indicating that the first device 202-1 or the second device 202-2 may be added. If a user input requesting addition of the first device 202-1 or the second device 202-2 is received, the user device 201 may transmit, to the first device 202-1 or the second device 202-2, the information about the link that is already connected.

Referring back to FIG. 5, in operation 515, the first device 202-1 and the second device 202-2 may establish the third link (e.g., the third link 215 of FIG. 2). The establishment of the third link 215 is an example, and various embodiments of the present disclosure are not limited thereto. For example, the first device 202-1 and the second device 202-2 may establish the third link 215 before the establishment of the first link 205 (e.g., operation 505). For another example, the first device 202-1 and the second device 202-2 may establish the third link 215 before the establishment of the second link 210 (e.g., operation 510). For another example, the first device 202-1 and the second device 202-2 may establish the third link 215 substantially simultaneously with the establishment of the first link 205 or the establishment of the second link 210. For another example, the establishment of the third link 215 (e.g., operation 515) may be skipped, and, in this case, the first link information (e.g., operation 520) may be shared with the second device 202-2 via an external server (not shown).

In operation 520, information associated with the first link 205 may be shared with the second device 202-2. According to an embodiment, the user device 201 or the first device 202-1 may share the information associated with the first link 205 with the second device 202-2. For example, the first device 202-1 may transmit, to the second device 202-2, information associated with the first link 205 via the third link 215. For another example, the user device 201 may transmit the information associated with the first link 205 to the second device 202-2 via the second link 210. For another example, the user device 201 or the first device 202-1 may transmit the information associated with the first link 205 to the second device 202-2 via an external server (e.g., the external server 203 of FIG. 2) or via an external electronic device (e.g., charging cases of the first device 202-1 and the second device 202-2). According to an embodiment, the user device 201 or the first device 202-1 may determine whether to share the information associated with the first link 205. For example, if the information associated with the first link 205 is determined to be shared, the user device 201 or the first device 202-1 may transmit the information associated with the first link 205 to the second device 202-2. The information associated with the first link 205 may include, for example, at least one of address information, clock information, channel information, SDP result information, information about supported functions, key information, or EIR packets.

In operation 525, the user device 201 may transmit a data packet (e.g., first data packet) including content to the first device 202-1 via the first link 205. In operation 530, the second device 202-2 may monitor the first link 205 based on at least a portion (e.g., address information or clock information) of the information associated with the first link 205. The second device 202-2 may receive the same data packet as the data packet (e.g., first data packet) received by the first device 202-1 through monitoring. Operation 530 may be referred to, for example, as shadowing, listening, or snooping.

According to various embodiments, each of the first link 205, the second link 210, and the third link 215 may be a link based on a Bluetooth legacy protocol or a BLE protocol.

Figure 7:
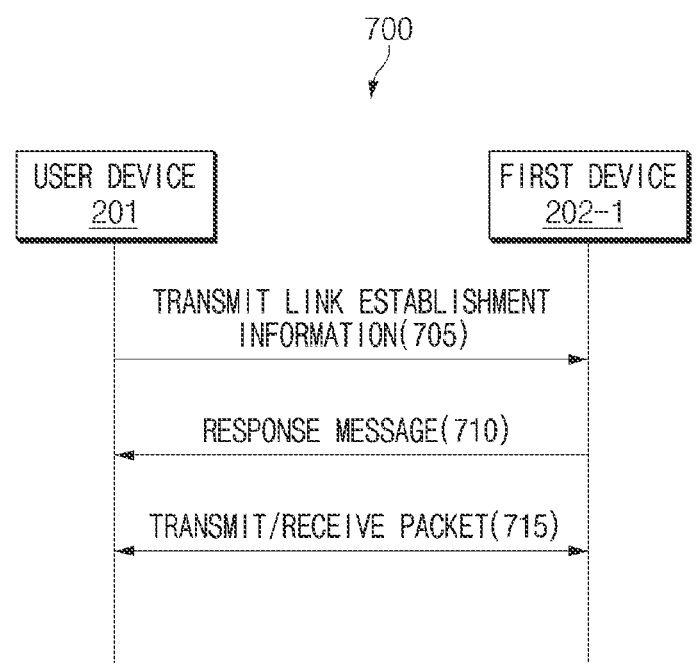
FIG. 7 is a signal flow diagram illustrating an example signal flow for creating a link between a user device and a first device according to various embodiments.

FIG. 7 is a signal flow diagram 700 illustrating an example signal flow for creating a link between a user device and a first device according to various embodiments.

According to an embodiment, after creating the first link 205 (e.g., operation 505 of FIG. 5), the user device 201 and the first device 202-1 may create a link (e.g., eSCO link) for exchanging audio data. For example, the user device 201 may create the link for exchanging audio data in response to execution of an application requesting voice recognition or a call application or execution of a function of the corresponding application. In this case, the user device 201 may create the link for exchanging audio data via the first link 205. The link for exchanging audio data may be a link having the same channel access code as the first link 205 and having a different address (e.g., LT_ADDR) from that of the first link 205.

In operation 705, the user device 201 may transmit information for link establishment to the first device 202-1. The user device 201 may transmit the information for link establishment using a link manager (LM) message (e.g., eSCO_req LM message). The information for link establishment may include transmission/reception period information (e.g., TeSCO), retransmission window information (e.g., WeSCO), packet type information (e.g., transmission packet size and/or reception packet size), and/or address information (e.g., LT_ADDR). For example, the information for link establishment may be referred to as a parameter associated with a link.

In operation 710, when link operation is possible according to the information for link establishment received by the first device 202-1, the first device 202-1 may transmit a response message (e.g., accepted_ext Message). For example, the response message may include information indicating consent to the information for link establishment received from the user device. When the first device 202-1 agrees on creation of a link for exchanging audio data but desires to change a parameter of the link, the first device 202-1 may transmit, to the user device 201, a message (e.g., eSCO_req Message) for link establishment including a parameter desired to be changed. The user device 201 and the first device 202-1 may perform a negotiation until a response message (e.g., accepted_ext Message) for the message for link establishment is received from a counterpart device.

In operation 715, the user device 201 and the first device 202-1 may transmit/receive a packet (e.g., a packet including audio data) via a created eSCO link.

Figure 8A:
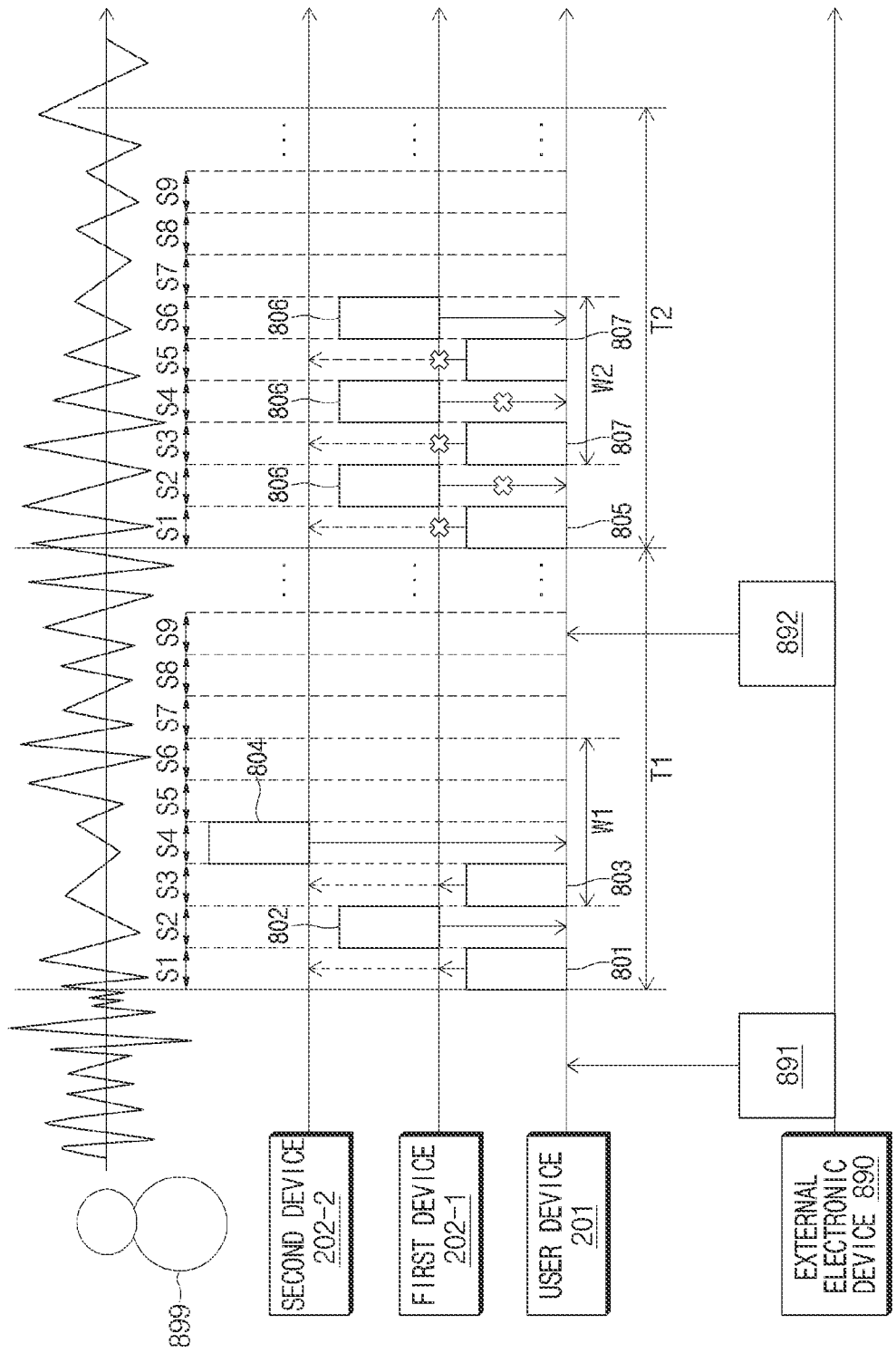
FIG. 8A is a diagram illustrating example packet exchange by transmitting additional data according to various embodiments.

FIG. 8A is a diagram illustrating example packet exchange by transmitting additional data according to various embodiments.

In the example of FIG. 8A, the first device 202-1 and the user device 201 may be in a state in which the devices are connected via a link created according to the operations illustrated in FIG. 7. It may be assumed that the second device 202-2 is in a state of monitoring a link between the first device 202-1 and the user device 201. A user 899, who may, for example, be the user of the user device 201, may speak while wearing the first device 202-1 and the second device 202-2. The user device 201 may be in a state of being connected to an external electronic device 890 to perform a voice call or video call, record audio data, or recognize a voice. Furthermore, in the example of FIG. 8A, the second device 202-2 may be configured to transmit additional data. For example, the first device 202-1 and/or the user device 201 may determine that the second device 202-2 should transmit additional data after establishing the eSCO link of FIG. 7 or while performing operations for establishing the eSCO link. For example, the first device 202-1 may determine that the second device 202-2 should transmit additional data via the third link 215 or may negotiate with the second device 202-2. In an embodiment, when the user device 201 is not aware of presence of the second device 202-2, the user device 201 may recognize that additional data transmitted from the second device 202-2 has been transmitted from the first device 202-1. For example, the first device 202-1 may determine that the first device 202-1 should transmit additional data after establishing the eSCO link of FIG. 7 with the user device 201 or while performing operations for establishing the eSCO link, and may negotiate with the second device 202-2 to determine that the second device 202-2 should transmit additional data. For example, since the second device 202-2 transmits additional data based on information about a link (e.g., the first link 205) established between the user device 201 and the first device 202-1 and information (e.g., device address information) about the first device 202-1, the user device 201 may determine that the additional data has been transmitted from the first device 202-1.

In FIG. 8A, the eSCO link between the user device 201 and the first device 202-1 may be configured to have, for example, 16-slot transmission/reception period TeSCO and 4-slot retransmission window WeSCO. Although the user device 201 and the first device 202-1 are illustrated as exchanging data using a single slot, various embodiments of the present disclosure are not limited thereto. Furthermore, although the user device 201 is regarded as a master device of the eSCO link in FIG. 8A, various embodiments of the present disclosure are not limited thereto.

In the example of FIG. 8A, the user device 201 may receive first external data 891 from the external electronic device 890. For example, the user device 201 may receive the first external data 891 and/or second external data 892 from the external electronic device 890 via the first communication circuit 391 (e.g., cellular network and/or Internet).

On a first slot S1 of a first transmission/reception interval T1, the user device 201 may transmit first data 801 via the eSCO link. The first device 202-1 and the second device 202-2 may receive the first data 801. For example, the first data 801 may include audio data corresponding to at least a portion of audio data included in the first external data 891. For another example, the first data 801 may correspond to NULL data.

On a second slot S2 of the first transmission/reception interval T1, the first device 202-1 may transmit second data 802 via the eSCO link. The second data 802 may include, for example, audio data obtained by the first device 202-1 in a time interval prior to the first transmission/reception interval T1. For example, the second data 802 may include ACK/NACK information about the first data 801. ARQN information of a header of the second data 802 may be set to ACK.

On a third slot S3 of the first transmission/reception interval T1, the user device 201 may transmit third data 803 via the eSCO link. For example, the third data 803 may be a POLL packet including ACK information about the second data 802.

According to an embodiment, the second device 202-2 may transmit additional data using at least one slot of a first retransmission window W1. The second device 202-2 may transmit additional data (e.g., fourth data 804) on a fourth time slot S4 configured for retransmission by the first device 202-1 in the first retransmission window W1. For example, the additional data may include audio data obtained by the second device 202-2 at substantially the same time as the second data 802. For another example, the additional data may include an arbitrary audio enhancement parameter obtained at substantially the same time as the second data 802. Although FIG. 8A illustrates that the second device 202-2 transmits the additional data, embodiments of the present disclosure are not limited thereto. For example, the first device 202-1 and/or the user device 201 may be configured to transmit additional data in a retransmission window.

In the example of FIG. 8A, the user device 201 may generate enhanced audio data using the second data 802 and the fourth data 804. The user device 201 may transmit the enhanced audio data (not shown) to the external electronic device 890. In an embodiment, the user device 201 may recognize that the fourth data 804 has been received from the first device 202-1. Since the second device 202-2 transmits the fourth data 804 using a radio resource of the eSCO link generated through the first link 202-1, the user device 201 may recognize that the fourth data 804 has been received from the first device 202-1.

Although transmission/reception of all data has been successfully performed in the first transmission/reception interval T1, data transmission/reception may fail in a second transmission/reception interval T2 due to deterioration in a communication environment.

On a first slot S1 of the second transmission/reception interval T2, the user device 201 may transmit fifth data 805 via the eSCO link. The first device 202-1 and the second device 202-1 may receive the fifth data 805. The fifth data 805 may include audio data corresponding to at least a portion of audio data included in the first external data 891 and/or second external data 892.

On a second slot S2 of the second transmission/reception interval T2, the first device 202-1 may transmit sixth data 806 via the eSCO link. The sixth data 806 may include audio data obtained by the first device 202-1 in a time interval prior to the second transmission/reception interval T2. For example, ARQN information of a header of the sixth data 806 may be set to ACK. In the example of FIG. 8A, the user device 201 may fail to receive the sixth data 806.

On a third time slot S3 of a second retransmission window W2, the user device 201 may transmit, via the eSCO link, data (hereinafter seventh data 807) for retransmission of the fifth data, due to a failure of reception of ACK for the fifth data. For example, the seventh data 807 may include information indicating NACK in a header and at least a portion of the fifth data 805.

On a fourth time slot S4 of the second retransmission window W2, the second device 202-2 may transmit eighth data 808 including additional data. Even when information (e.g., the seventh data 807) including NACK is received from the user device 201, the second device 202-2 may transmit additional data using a slot (e.g., the fourth slot S4) configured for transmission of additional data among slots configured for retransmission. The user device 201 may fail to receive the eight data 808.

On a fifth time slot S5 of the second retransmission window W2, the user device 201 may retransmit the seventh data 807. On a sixth time slot S6 of the second retransmission window W2, the first device 202-1 may attempt to retransmit the sixth data 806. In the example of FIG. 8A, the user device 201 may obtain only the sixth data 806 transmitted on the sixth time slot S6. For another example, although not illustrated, the user device 201 may fail to receive data retransmitted in the second retransmission window W2. In this case, in a subsequent transmission/reception interval (not shown), the user device 201 may attempt to transmit new data (e.g., ninth data (not shown)) even when the user device 201 has failed to receive the sixth data 806 and/or the eighth data 808.

The transmission of additional data using a retransmission window, illustrated in FIG. 8A, is an example, and embodiments of the present disclosure are not limited thereto. For example, the various embodiments described below may be used with regard to the type of additional data, an additional data transmission device, a method of transmitting additional data, and/or retransmission of data.

FIG. 8B is a diagram illustrating example packet exchange by transmitting additional data according to various embodiments.

According to an embodiment, not only the second device 202-2 but also the user device 201 may be configured to transmit additional data. Hereinafter, a method for the user device 201 and the second device 202-2 to transmit additional data will be described with reference to FIG. 8B. The above descriptions provided above with reference to FIG. 8A may be applied to the following descriptions unless otherwise described.

Referring to FIG. 8B, the user device 201 and the second device 202-2 may be configured to transmit additional data. For example, the first device 202-1 and/or the user device 201 may determine that the user device 201 and the second device 202-2 should transmit additional data after establishing the eSCO link of FIG. 7 or while performing operations for establishing the eSCO link. In an embodiment, the user device 201 may recognize that additional data transmitted from the second device 202-2 has been transmitted from the first device 202-1.

On a first slot S1 of a first transmission/reception interval T1, the user device 201 may transmit first data 801 via the eSCO link. On a second slot S2 of the first transmission/reception interval T1, the first device 202-1 may transmit second data 802 via the eSCO link.

On a third slot S3 of the first transmission/reception interval T1, the user device 201 may transmit third data 803 via the eSCO link. The third data 803 may include additional data obtained by the user device 201 or received from the external electronic device 890. For example, the additional data may be for the first data 801. For example, the third data 803 may include ACK information about the second data 802 in a header. The first device 202-1 and/or the second device 202-2 may generate enhanced audio data using the first data 801 and the third data 803.

On a first slot S1 of the second transmission/reception interval T2, the user device 201 may transmit fifth data 805 via the eSCO link. The first device 202-1 and the second device 202-1 may fail to receive the fifth data 805. The fifth data 805 may include audio data corresponding to at least a portion of voice audio data included in the first external data 891 and/or second external data 892.

On a second slot S2 in the second transmission/reception interval T2, the first device 202-1 may transmit sixth data 806 via the eSCO link. For example, the ARQN information of a header of the sixth data 806 may be set to NACK. In the example of FIG. 8B, the user device 201 may fail to receive the sixth data 806.

On a third time slot S3 in the second retransmission window W2, the user device 201 may transmit seventh data 807 including additional data. For example, the seventh data 807 may include additional data for the fifth data 805. The seventh data 807 may include information indicating NACK in a header.

On a fourth time slot S4 in the second retransmission window W2, the second device 202-2 may transmit eighth data 808 including additional data. The user device 201 may fail to receive the eight data 808.

On a fifth time slot S5 in the second retransmission window W2, the user device 201 may retransmit the fifth data 805. The user device 201 may perform retransmission of the fifth data 805 on the fifth time slot S5 rather than the third time slot S3 configured for transmission of additional data. In this case, a header of the fifth data 805 may include information indicating NACK. On a sixth time slot S6 of the second retransmission window W2, the first device 202-1 may attempt to retransmit the sixth data 806.

Although FIGS. 8A and 8B illustrate that each of the user device 201, the first device 202-1, and the second device 202-2 uses one slot to transmit data, various embodiments of the present disclosure are not limited thereto. For example, the user device 201, the first device 202-1, and/or the second device 202-2 may transmit data using a plurality of successive slots.

In an embodiment, each of the user device 201, the first device 202-1, and the second device 202-2 may be configured to transmit data using three successive slots. In this case, one transmission/reception interval of the eSCO link may include 18 slots, and a retransmission window in one transmission/reception interval may include six slots. For example, the user device 201 may be configured to transmit data (e.g., first data) using three earliest slots in a transmission/reception interval, and the first device 202-1 may be configured to transmit data (e.g., second data) using three slots following the first data. Six slots from an eighth slot in a transmission/reception interval may be configured as a retransmission window. For example, three front slots of the retransmission window may be used for data transmission (e.g., transmission of ACN/NACK and/or additional data) of the user device 201, and three rear slots may be used for data transmission (e.g., transmission of ACN/NACK and/or additional data) of the first device 202-1 or the second device 202-2. In another example, the user device 201 may be configured to transmit data using three successive slots, and each of the first device 202-1 and the second device 202-2 may be configured to transmit data using one slot. In this case, one transmission/reception interval of the eSCO link may include 18 slots, and a retransmission window in one transmission/reception interval may include six slots. For example, the user device 201 may be configured to transmit data (e.g., first data) using three earliest slots in a transmission/reception interval, and the first device 202-1 may be configured to transmit data (e.g., second data) using one slot following the first data. Six slots from a fourth slot in a transmission/reception interval may be configured as a retransmission window. For example, three front slots of the retransmission window may be used for data transmission (e.g., transmission of ACN/NACK and/or additional data) of the user device 201, and a fourth slot of the retransmission window may be used for data transmission (e.g., transmission of ACN/NACK and/or additional data) of the first device 202-1 or the second device 202-2.

Although FIGS. 8A and 8B illustrate that the first device 202-1 transmits obtained audio data (the second data 802 or the sixth data 806), and the second device 202-2 transmits additional data in a retransmission window (W1 and W2), embodiments of the present disclosure are not limited thereto. For example, as described below with reference to FIGS. 19 and 22, the second device 202-2 may transmit audio data. The second device 202-2 may be configured to transmit audio data on a transmission slot (e.g., S2) rather than a retransmission window. The first device 202-1 may be configured to transmit additional data in a retransmission window. The user device 201, the first device 202-1, and/or the second device 202-2 may dynamically determine and/or negotiate about a device that is to transmit audio data and/or additional data.

Figure 9:
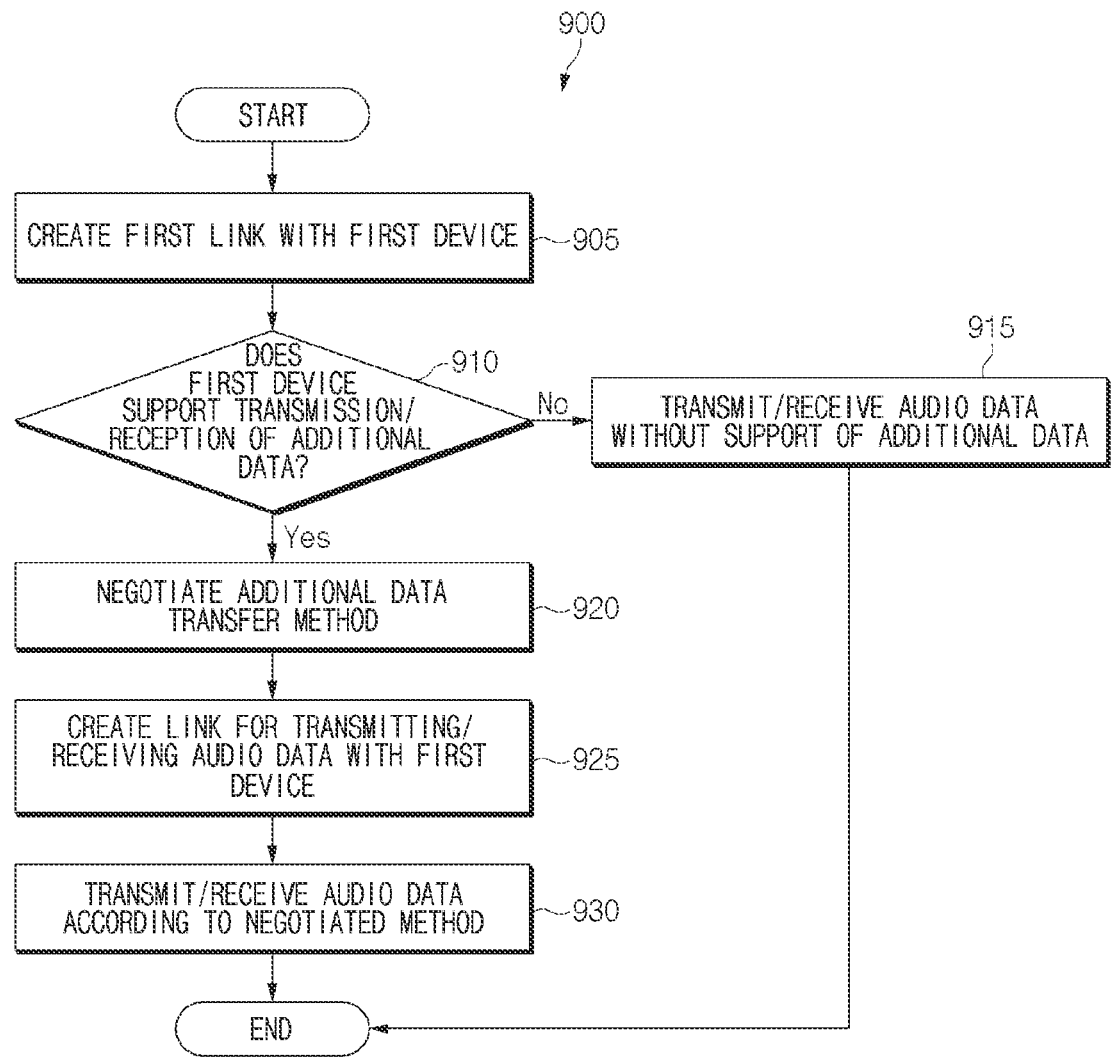
FIG. 9 is a flowchart illustrating an example additional data transceiving method of a user device according to various embodiments.

FIG. 9 is a flowchart 900 illustrating an example additional data transceiving method of a user device according to various embodiments.

In operation 905, the user device 201 may create the first link 205 with the first device 202-1. For example, the user device 201 may create the first link 205 according to operation 505 of FIG. 5.

In operation 910, the user device 201 may determine whether the first device 202-1 supports transmission/reception of additional data. For example, when the user device 201 and the first device 202-1 support transmission/reception of additional data, the user device 201 may perform transmission/reception of additional data according to embodiments of the present disclosure.

According to an embodiment, the user device 201 may determine whether the first device 202-1 supports transmission/reception of additional data based on capability information about the first device 202-1. The user device 201 may determine whether the first device 202-1 supports transmission/reception of additional data when being paired with the first device 202-1. The user device 201 may receive the capability information (e.g., supported feature information) about the first device 202-1 from the first device 202-1 while connecting to the first link 205 or after connecting to the first link 205.

According to an embodiment, the user device 201 may determine whether the first device 202-1 supports transmission/reception of additional data based on a specified signal received from the first device 202-1. For example, upon receiving a command indicating that the first device 202-1 supports additional data, the user device 201 may determine that the first device 202-1 supports additional data.

In the case of not supporting additional data (e.g., 910-N), in operation 915, the user device 201 may transmit/receive audio data without a support of additional data. In this case, the user device 201 and the first device 202-1 may use a retransmission window only for retransmitting data. According to an embodiment, even if the first device 202-1 does not support additional data, the user device 201 may determine a device that is to transmit audio data (e.g., a device that is to transmit data on the second slot S2 of FIGS. 8A and 8B) among the first device 202-1 and the second device 202-2. A method for the user device 201 to determine an audio data transmission device will be described later with reference to FIG. 18.

When the first device 202-1 supports transmission/reception of additional data (e.g., 910-Y), in operation 920, the user device 201 may negotiate with the first device 202-1 about a method of transferring additional data. For example, a negotiation about a method of transferring additional data may include a negotiation about at least one of a transmission time of additional data, a transmission entity of additional data, a retransmission method associated with transmission of additional data, and/or the type of additional data. The user device 201 may negotiate the method of transferring additional data by exchanging information about the method of transferring additional data with the first device 202-1 or by transmitting information about the method of transferring additional data to the first device 202-1. For example, through the negotiation with the first device 202-1, the user device 201 may determine an entity (e.g., the user device 201 and/or the first device 202-1) for transmitting additional data and a time (e.g., time slot) at which additional data will be transmitted. According to an embodiment, the user device 201 may determine a device that is to transmit audio data (e.g., a device that is to transmit data on the second slot S2 of FIGS. 8A and 8B) among the first device 202-1 and the second device 202-2. For example, the user device 201 may determine a device that is to transmit audio data during a negotiation about an additional data transfer method (e.g., operation 920). A method for the user device 201 to determine an audio data transmission device will be described later with reference to FIG. 18.

In operation 925, the user device 201 may create a link (e.g., eSCO link) for transmitting/receiving audio data with the first device 202-1. For example, the user device 201 may create the link for transmitting/receiving audio data according to operations 705 and 710 of FIG. 7.

In operation 930, the user device 201 may transmit/receive audio data according to a negotiated method. In this case, the user device 201 may transmit additional data or receive additional data in at least a portion of the retransmission window WeSCO according to the negotiated method.

Although FIG. 9 illustrates that operation 910 and operation 920 are performed before operation 925, embodiments of the present disclosure are not limited thereto. For example, operation 910 may be performed while operation 905 is performed. For another example, operation 920 may be performed while operation 925 is performed. For another example, operation 920 may be skipped. In this case, the user device 201 may transmit/receive additional data according to a specified method without an additional negotiation procedure. For another example, when transmission/reception of additional data is determined to be necessary (e.g., when quality deterioration occurs) while transmitting/receiving audio data without a support of additional data in operation 915, operation 910 and the following operations may be performed to transmit/receive additional data.

According to an embodiment, operation 910 and operation 920 may be performed during creation (e.g., operation 925) of a link for transmitting/receiving audio data. For example, the user device 201 may transmit, to the first device 202-1, link establishment information (e.g., operation 705 of FIG. 7) for creating the link for transmitting/receiving audio data. The link establishment information may include codec information to be used to transmit/receive audio data. The user device 201 may indicate that the user device 201 supports transmission/reception of additional data by setting a specified value in the codec information. When consent information for the code information is received (e.g., operation 710 of FIG. 7) from the first device 202-1, the user device 201 may determine that the first device 202-1 supports transmission/reception of additional data. Furthermore, for example, the user device 201 may perform a negotiation about a method of transmitting/receiving additional data by adding, to the link establishment information, information about the method of transmitting/receiving additional data. For another example, when it is determined that the first device 202-1 supports transmission/reception of additional data, the user device 201 may negotiate with the first device 202-1 about a method of transmitting/receiving additional data using an additional message while or after generating the link for transmitting/receiving audio data.

Figure 10:
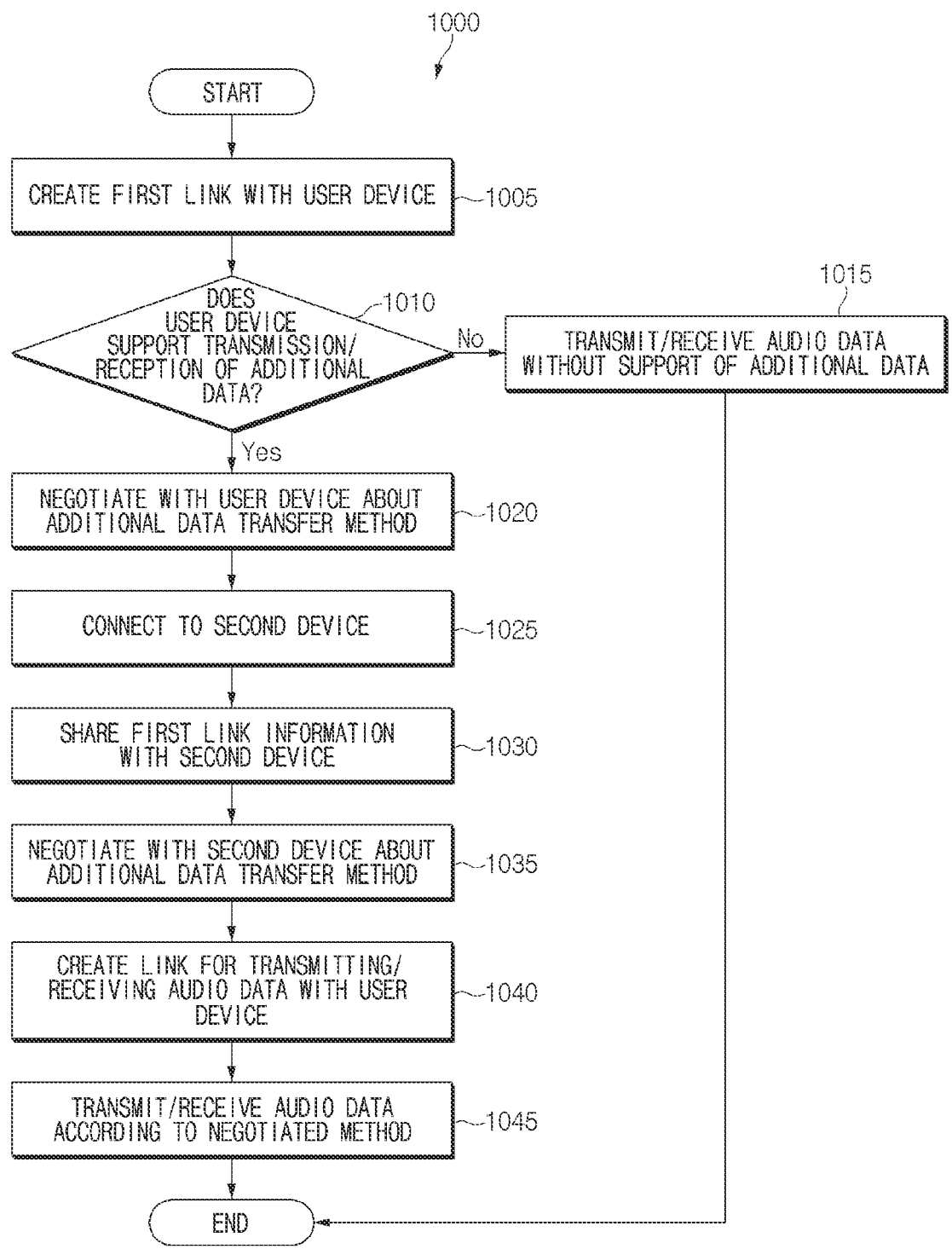
FIG. 10 is a flowchart illustrating an example additional data transceiving method of a first device according to various embodiments.

FIG. 10 is a flowchart 1000 illustrating an example additional data transceiving method of a first device according to various embodiments.

In operation 1005, the first device 202-1 may create the first link 205 with the user device 201. For example, the first device 202-1 may create the first link 205 according to operation 505 of FIG. 5.

In operation 1010, the first device 202-1 may determine whether the user device 201 supports transmission/reception of additional data. According to an embodiment, the first device 202-1 may determine whether the user device 201 supports transmission/reception of additional data based on capability information about the user device 201. The first device 202-1 may receive the capability information (e.g., supported feature information) about the user device 201 from the user device 201 while connecting to the first link 205 or after connecting to the first link 205. For example, the supported feature information about the user device 201 may include information indicating whether the user device 201 supports additional data. According to an embodiment, the first device 202-1 may determine whether the user device 201 supports transmission/reception of additional data based on a specified signal (e.g., a signal including a command indicating support of additional data) received from the first device 202-1.

In the case of not supporting additional data (e.g., 1010-N), in operation 1015, the first device 202-1 may transmit/receive audio data without a support of additional data. In this case, the user device 201 and the first device 202-1 may use the retransmission window WeSCO only for retransmitting data.

In the case of supporting additional data (e.g., 1010-Y), in operation 1020, the first device 202-1 may negotiate with the user device 201 about a method of transferring additional data. The above descriptions provided with reference to FIG. 9 may be referred to with regard to the method of transferring additional data.

In operation 1025, the first device 202-1 may be connected to the second device 202-2. For example, the first device 202-1 may be connected to the second device 202-2 by creating the third link 215 according to operation 515 of FIG. 5. Although FIG. 10 illustrates that operation 1025 is performed after operation 1020, embodiments of the present disclosure are not limited thereto. For example, operation 1025 may be performed before operation 1005 or operation 1010.

In operation 1030, the first device 202-1 may share first link information with the second device 202-2. For example, the first device 202-1 may share the first link information according to operation 520 of FIG. 5.

In operation 1035, the first device 202-1 may negotiate with the second device 202-2 about a method of transferring additional data. For example, when creating the eSCO link with the user device 201, the first device 202-1 may negotiate with the second device 202-2 about a method of transferring additional data. According to an embodiment, the first device 202-1 may negotiate with the second device 202-2 about when additional data should be transmitted or which device should transmit additional data based on information (e.g., transmission/reception period TeSCO or retransmission window WeSCO) about the eSCO link created with the user device 201. For example, a negotiation may be performed so that additional data is to be transmitted by the second device 202-2 or the first device 202-1 on a first transmission slot (e.g., the fourth slot S4 of FIG. 8A) of a retransmission window. For another example, a negotiation may be performed so that additional data is to be transmitted by the second device 202-2 or the first device 202-1 based on data (e.g., response data including ACK or NACK) received from the user device 201 on a first reception slot (e.g., the third slot S3 of FIG. 8A) of a retransmission window.

In an embodiment, operation 1035 may be skipped. For example, the first device 202-1 and the second device 202-2 may transfer additional data according to a specified method. For another example, the first device 202-1 may notify the second device 202-2 of a method to be used for transmitting additional data.

According to an embodiment, the first device 202-1 may negotiate with the second device 202-2 about a device that is to transmit audio data (e.g., a device that is to transmit data on the second slot S2 of FIGS. 8A and 8B). For example, the user device 201 may determine a device that is to transmit audio data during a negotiation about an additional data transfer method (e.g., operation 1035). A method for the user device 201 to determine an audio data transmission device will be described later with reference to FIGS. 19 and 20.

In operation 1040, the first device 202-1 may create a link (e.g., eSCO link) for transmitting/receiving audio data with the user device 201. For example, the first device 202-1 may create the link for transmitting/receiving audio data according to operations 705 and 710 of FIG. 7. Although FIG. 10 illustrates that the first device 202-1 performs operation 1040 after operation 1035, embodiments of the present disclosure are not limited thereto. For example, the first device 202-1 may perform operation 1040 at an arbitrary time after creating (e.g., operation 1005) the first link 205 with the user device 201. The first device 202-1, for example, may perform operation 1040 before operation 1010.

In operation 1045, the first device 202-1 may transmit/receive audio data according to a negotiated method. For example, the first device 202-1 may be configured to transmit additional data in at least a portion of a retransmission window according to the negotiated method. For another example, the first device 202-1 may be configured to receive additional data from the user device 201 in at least a portion of a retransmission window according to the negotiated method. For another example, when the first device 202-1 and/or the second device 202-2 are configured to transmit additional data, the first device 202-1 and the second device 202-2 may be configured to transmit additional data at different timings in a retransmission window.

Figure 11:
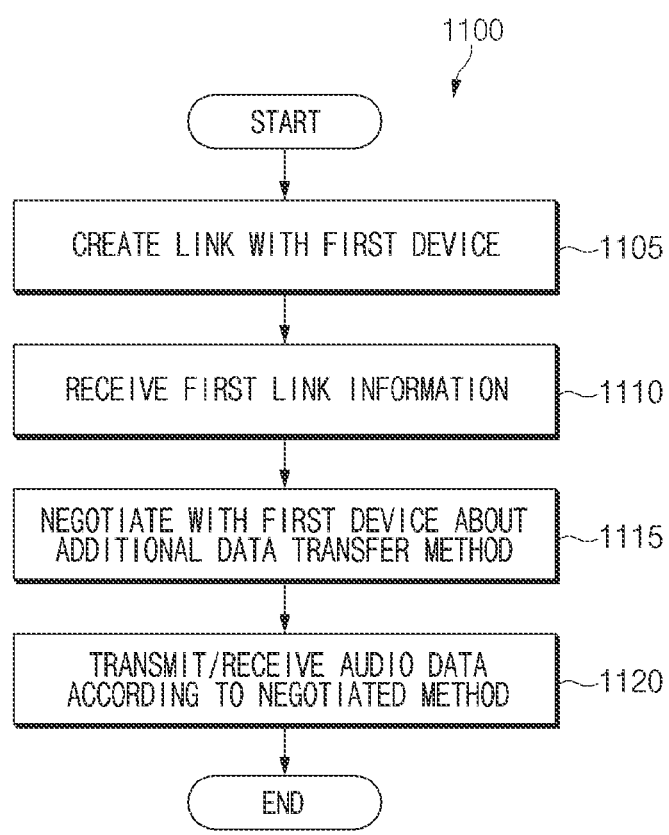
FIG. 11 is a flowchart illustrating an example additional data transceiving method of a second device according to various embodiments.

FIG. 11 is a flowchart 1100 illustrating an example additional data transceiving method of a second device according to various embodiments.

In operation 1105, the second device 202-2 may create a link with the first device 202-1. For example, the second device 202-2 may be connected to the first device 202-1 by creating the third link 215 according to operation 515 of FIG. 5.

In operation 1110, the second device 202-2 may receive first link information from the first device 202-1. For example, the second device 202-2 may receive the first link information according to operation 520 of FIG. 5.

In operation 1115, the second device 202-2 may negotiate with the first device 202-1 about a method of transferring additional data. For example, the second device 202-2 may negotiate with the first device 202-1 about a method of transferring additional data according to operation 1035 of FIG. 10. For another example, in the case of transferring additional data according to a specified method, operation 1115 may be skipped.

In operation 1120, the second device 202-2 may transmit/receive audio data according to a negotiated method. In this case, the second device 202-2 may transmit additional data or receive additional data in at least a portion of a retransmission window according to the negotiated method. For example, the second device 202-2 may transmit additional data to the user device 201 using a radio resource of a link (e.g., eSCO link) for voice data transmission/reception established between the user device 201 and the first device. The second device 202-2 may receive additional data transmitted from the user device 201 by listening the link for voice data transmission/reception established between the user device 201 and the first device.

Figure 12:
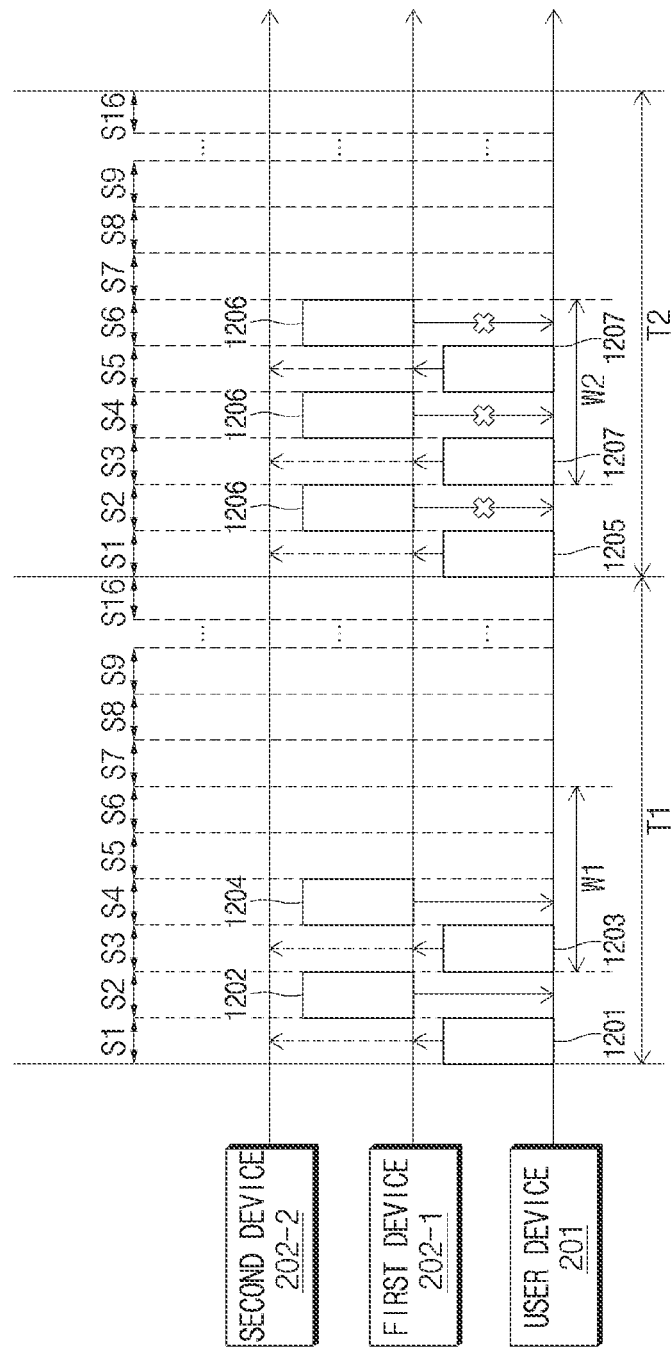
FIG. 12 is a diagram illustrating example packet exchange by transmitting additional data by a first device according to various embodiments.

FIG. 12 is a diagram illustrating example packet exchange by transmitting additional data by a first device according to various embodiments.

In the example of FIG. 12, the first device 202-1 may be configured to transmit additional data in a retransmission window. For example, the user device 201 and the second device 202-2 may be configured not to transmit additional data.

In FIG. 12, the eSCO link between the user device 201 and the first device 202-1 may be configured to have, for example, 16-slot transmission/reception period TeSCO (e.g., T1 or T2) and 4-slot retransmission window WeSCO (e.g., W1 or W2). In the present example, a retransmission window (e.g., W1 or W2) may include a third time slot S3, a fourth time slot S4, a fifth time slot S5, and a sixth time slot S6. Although the user device 201 and the first device 202-1 are illustrated as exchanging data using a single slot, various embodiments of the present disclosure are not limited thereto. Furthermore, although the user device 201 is regarded as a master device of the eSCO link in FIG. 12, various embodiments of the present disclosure are not limited thereto.

In an embodiment, on a first time slot S1 of a first transmission/reception interval T1, the user device 201 may transmit first data 1201 via the eSCO link generated with the first device 202-1. On a second time slot S2, the first device 202-1 may transmit second data 1202 including audio data obtained by the first device 202-1 to the user device 201 via the eSCO link. In an example, the second data 1202 may further include ACK information about the first data 1201. On a first time slot (e.g., the third time slot S3) of a subsequent first retransmission window W1, the user device 201 may transmit third data 1203 including ACK for the second data 1202 to the first device 202-1 via the eSCO link.

On the fourth time slot S4 of the first transmission/reception interval T1, the first device 202-1 may transmit fourth data 1204 including additional data to the user device 201 via the eSCO link. The additional data may include information for enhancing the audio data of the second data 1202. For example, the fourth data 1204 may include audio data of another channel obtained at the same time as the audio data of the second data 1202. For example, the second data 1202 may be audio data obtained through the first microphone of the first device 202-1, and the fourth data 1204 may be audio data obtained through the second microphone of the first device 202-1. For another example, the fourth data 1204 may include a sound quality enhancement parameter for enhancing a sound quality of the second data 1202. The user device 201 may perform sound quality enhancement using the second data 1202 and the fourth data 1204. For example, the sound quality enhancement parameter may include comparison information (e.g., similarity, correlation value, and/or Euclidean distance) between audio data obtained through the first microphone of the first device 202-1 and audio data obtained through the second microphone of the first device 202-1. For example, the sound quality enhancement parameter may include reception sensitivity information generated based on a comparison between audio data obtained through the first microphone of the first device 202-1 and audio data obtained through the second microphone of the first device 202-1.

In an embodiment, on a first time slot S1 of the second transmission/reception interval T2, the user device 201 may transmit fifth data 1205 via the eSCO link. The fifth data 1205 may be continuation data of the first data 1201 stored by the user device 201 in a transmission buffer in order to be transmitted to the first device 202-1. On a second time slot S2, the first device 202-1 may transmit, via the eSCO link, sixth data 1206 including audio data obtained by the first device 202-1. The sixth data 1206 may be continuation data of the second data 1202 stored by the first device 202-1 in a transmission buffer in order to be transmitted to the user device 201. In an example, the sixth data 1206 may further include ACK information about the fifth data 1205. In the present example, the user device 201 may fail to receive the sixth data 1206. In this case, on a first time slot (e.g., the third time slot S3) of a subsequent first retransmission window W1, the user device 201 may transmit seventh data 1207 including NACK to the first device 202-1 via the eSCO link.

In response to reception of the seventh data 1207, the first device 202-1 may retransmit the sixth data 1206 to the user device 201 on the fourth time slot S4 of a second transmission/reception interval T2. For example, if a positive acknowledgement for the previously transmitted sixth data 1206 is not received from the user device 201, the first device 202-1 may repeatedly attempt to retransmit the sixth data 1206 within a retransmission window (e.g., a second retransmission window W2). In this case, the first device 202-1 may skip transmission of additional data. For another example, the first device 202-1 may attempt to retransmit the sixth data 1206 within a retransmission window (e.g., second retransmission window W2) and receive a positive acknowledgement for the retransmitted sixth data 1206. In this case, the first device 202-1 may confirm whether additional data is able to be transmitted during a remaining retransmission window (e.g., second retransmission window W2). When it is determined that additional data is able to be transmitted, the first device 202-1 may transmit additional data to the user device 201.

In the second transmission/reception interval T2 of FIG. 12, the user device 201 may fail to receive data transmitted from the first device 202-1. The second device 202-2 may identify that the user device 201 has failed to receive data from the first device 202-1 by monitoring data transmitted from the user device 201. The second device 202-2 may be configured to transmit audio data and/or additional data in a third transmission/reception interval (not shown) following the second transmission/reception interval T2 when the second device 202-2 has identified repeated failures of reception of data from the user device 201. In the third transmission/reception interval (not shown), the first device 202-1 may be configured not to transmit data, but the second device 202-2 may be configured to transmit data (e.g., audio data and/or additional data) in a similar manner to that of the first device 202-1. For example, the first device 202-1 may transmit, via the third link 215, a signal instructing a role change to the second device 202-2. Upon receiving the signal instructing a role change, the second device 202-2 may be configured to transmit audio data and/or additional data in the third transmission/reception interval (not shown) following the second transmission/reception interval T2.

With regard to FIG. 12, although it has been described that data is obtained through the first microphone and second microphone of the first device 202-1, embodiments of the present disclosure are not limited thereto. In the case where the first device 202-1 includes a plurality of microphones, the first device 202-1 may obtain audio data and/or additional data based on various combinations of the microphones. For example, the second data 1202 may be obtained using the first microphone of the first device 202-1, and the fourth data 1204 may be obtained using the second microphone and third microphone of the first device 202-1. For another example, the second data 1202 may be obtained using the first microphone and second microphone of the first device 202-1, and the fourth data 1204 may be obtained using the third microphone of the first device 202-1.

With regard to FIG. 12, although it has been described that only the first device 202-1 transmits additional data, embodiments of the present disclosure are not limited thereto. According to an embodiment, the user device 201 may also be configured to transmit additional data. In this case, the third data 1203 may include additional data for enhancing sound quality of the first data 1201. The seventh data 1207 transmitted on the third time slot S3 of the second transmission/reception interval T2 may include additional data for enhancing sound quality of the fifth data 1205.

Although FIG. 12 illustrates that the first device 202-1 transmits obtained audio data and additional data, embodiments of the present disclosure are not limited thereto. For example, as described below with reference to FIGS. 19 and 20, the second device 202-2 may transmit audio data and additional data. The user device 201, the first device 202-1, and/or the second device 202-2 may dynamically determine and/or negotiate about a device that is to transmit audio data and/or additional data.

Figure 13:
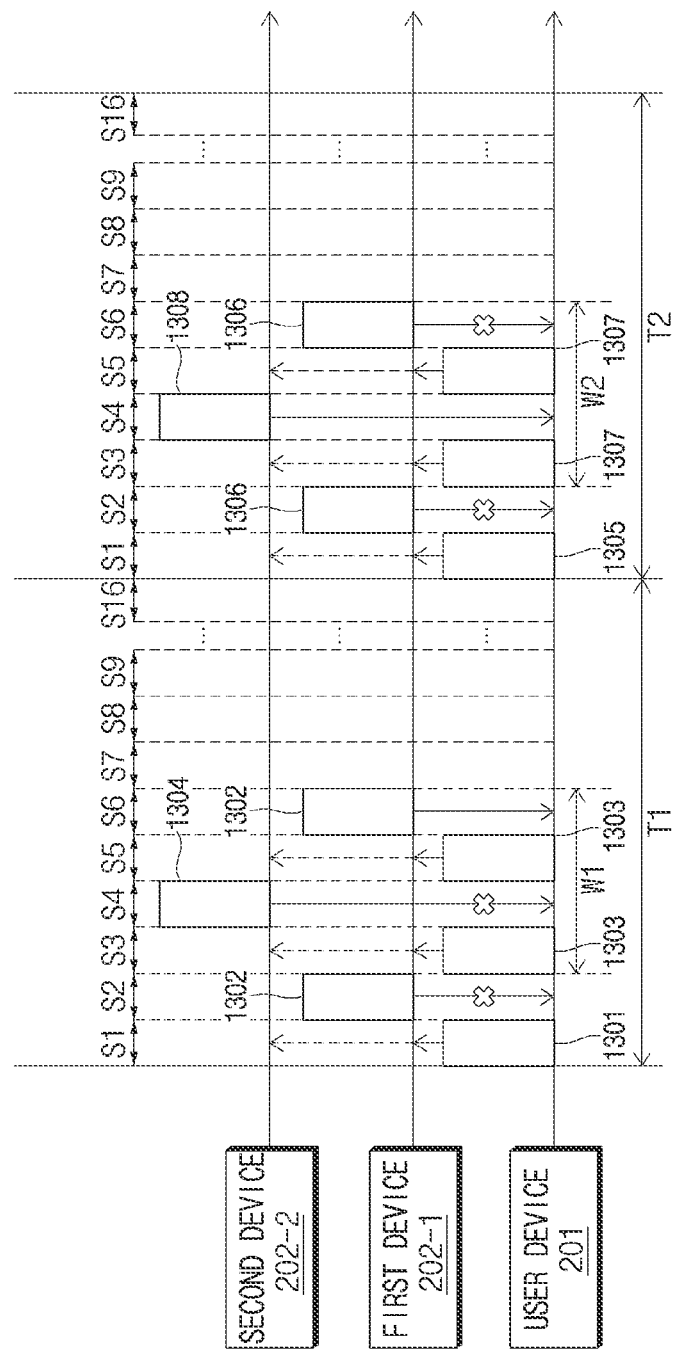
FIG. 13 is a diagram illustrating example packet exchange by transmitting additional data by a second device according to various embodiments.

FIG. 13 is a diagram illustrating example packet exchange by transmitting additional data by a second device according to various embodiments.

In the example of FIG. 13, the second device 202-2 may be configured to transmit additional data in a retransmission window. For example, the user device 201 and the first device 202-1 may be configured not to transmit additional data. The second device 202-2 may transmit additional data using a time slot allocated for transmission by the first device 202-1. In this case, additional data may be transmitted/received as described above with reference to FIG. 8A. Hereinafter, a data retransmission method that is different from that illustrated in FIG. 8A will be described with reference to FIG. 13.

In FIG. 13, the eSCO link between the user device 201 and the first device 202-1 may be configured to have, for example, 16-slot transmission/reception period TeSCO (e.g., T1 or T2) and 4-slot retransmission window WeSCO (e.g., W1 or W2). Although the user device 201 and the first device 202-1 are illustrated as exchanging data using a single slot, various embodiments of the present disclosure are not limited thereto. Furthermore, although the user device 201 is regarded as a master device of the eSCO link in FIG. 13, various embodiments of the present disclosure are not limited thereto.

For example, on a first time slot S1 of a first transmission/reception interval T1, the user device 201 may transmit first data 1301 to the first device 202-1 via the eSCO link generated with the first device 202-1. On a second time slot S2 of the first transmission/reception interval T1, the first device 202-1 may transmit second data 1302 including audio data obtained by the first device 202-1 to the user device 201 via the eSCO link. In an example, the second data 1302 may further include ACK information about the first data 1301. On the second slot S2, the user device 201 may fail to receive the second data 1302. In this case, on a third time slot S3 of the first transmission/reception interval T1, the user device 201 may transmit third data 1303 indicating NACK to the first device 202-1.

In the example of FIG. 13, in spite of reception of the third data 1303 indicating NACK, the second device 202-2 may transmit fourth data 1304 including additional data to the user device 201 on a fourth time slot S4 of the first transmission/reception interval T1. In a first retransmission window W1 of the first transmission/reception interval T1, the second device 202-2 may transmit the fourth data 1304 including additional data regardless of ACK/NACK from the user device 201. For example, the additional data may include information for enhancing the audio data of the second data 1302. For example, the fourth data 1304 may include audio data obtained by the second device 202-2. For another example, the fourth data 1304 may include a sound quality enhancement parameter obtained by the second device 202-2.

On a fifth time slot S5 of the first transmission/reception interval T1, the user device 201 may retransmit the third data 1303 to the first device 202-1 since the second device 1302 has not been received. The first device 202-1 may retransmit the second data 1302 to the user device 201 after additional data transmission of the second device 202-2. For example, the first device 202-1 may retransmit the second data 1302 on a sixth time slot S6 in the first transmission/reception interval T1. According to an embodiment, even when the user device 201 has failed to receive the second data 1302 transmitted from the first device 202-1 on the second time slot S2 of the first transmission/reception interval T1 and the fourth data 1304 transmitted from the second device 202-2 on the fourth time slot S4 of the first transmission/reception interval T1, the user device 201 may receive and process the second data 1302 retransmitted from the first device 202-1 on the sixth time slot S6 of the first transmission/reception interval T1.

For example, on a first time slot S1 of a second transmission/reception interval T2, the user device 201 may transmit fifth data 1305 to the first device 202-1 via the eSCO link generated with the first device 202-1. On a second time slot S2 of the second transmission/reception interval T2, the first device 202-1 may transmit sixth data 1306 including audio data obtained by the first device 202-1 to the user device 201 via the eSCO link. For example, the sixth data 1306 may include audio data that is subsequent to the audio data of the second data 1302 in a time domain. On a third time slot S3 of the second transmission/reception interval T2, the user device 201 may transmit seventh data 1307 indicating NACK to the first device 202-1 in response to non-reception of the sixth data 1306. The second device 202-2 may transmit eighth data 1308 including additional data to the user device 201 on a fourth time slot S4 of the second transmission/reception interval T2 in a similar manner to that of the first transmission/reception interval T1. In an embodiment, even if the additional data transmitted from the second device 202-2 is successfully received, the user device 201 may retransmit the seventh data 1307 on the fifth time slot S5 of the second transmission/reception interval T2 in order to retransmit the sixth data 1306. For example, when creating the first link 205 with the first device 202-1, the user device 201 may be aware of whether the first device 202-1 supports transmission/reception of additional data, and thus may transmit the seventh data 1307 to the first device 202-1. In response to reception of the seventh data 1307, the first device 202-1 may retransmit the sixth data 1306 to the user device 201 on a sixth time slot S6 of the second transmission/reception interval T2. In the example of FIG. 13, the user device 201 may be unable to receive the sixth data 1306 retransmitted from the first device 202-1.

According to an embodiment, the user device 201 may receive and process data or additional data transmitted from the first device 202-1 and/or the second device 202-2 in one transmission/reception interval (e.g., the first transmission/reception interval T1 or the second transmission/reception interval T2). For example, in the first transmission/reception interval T1, the user device 201 may generate audio data only using the second data 1302 received successfully. In the second transmission/reception interval T2, the user device 201 may generate audio data only using the eighth data 1308 successfully received.

With regard to FIG. 13, although it has been described that only the second device 202-2 transmits additional data, embodiments of the present disclosure are not limited thereto. According to an embodiment, the user device 201 may also be configured to transmit additional data. In this case, the third data 1303 may include additional data for enhancing sound quality of the first data 1301, and the seventh data 1307 may include additional data for enhancing sound quality of the fifth data 1305.

Although FIG. 13 illustrates that the first device 202-1 transmits obtained audio data (e.g., the second data 1302 and/or the sixth data 1306), embodiments of the present disclosure are not limited thereto. For example, as described below with reference to FIGS. 19 and 20, the second device 202-2 may transmit audio data. The user device 201, the first device 202-1, and/or the second device 202-2 may dynamically determine and/or negotiate about a device that is to transmit audio data and/or additional data.

Figure 14:
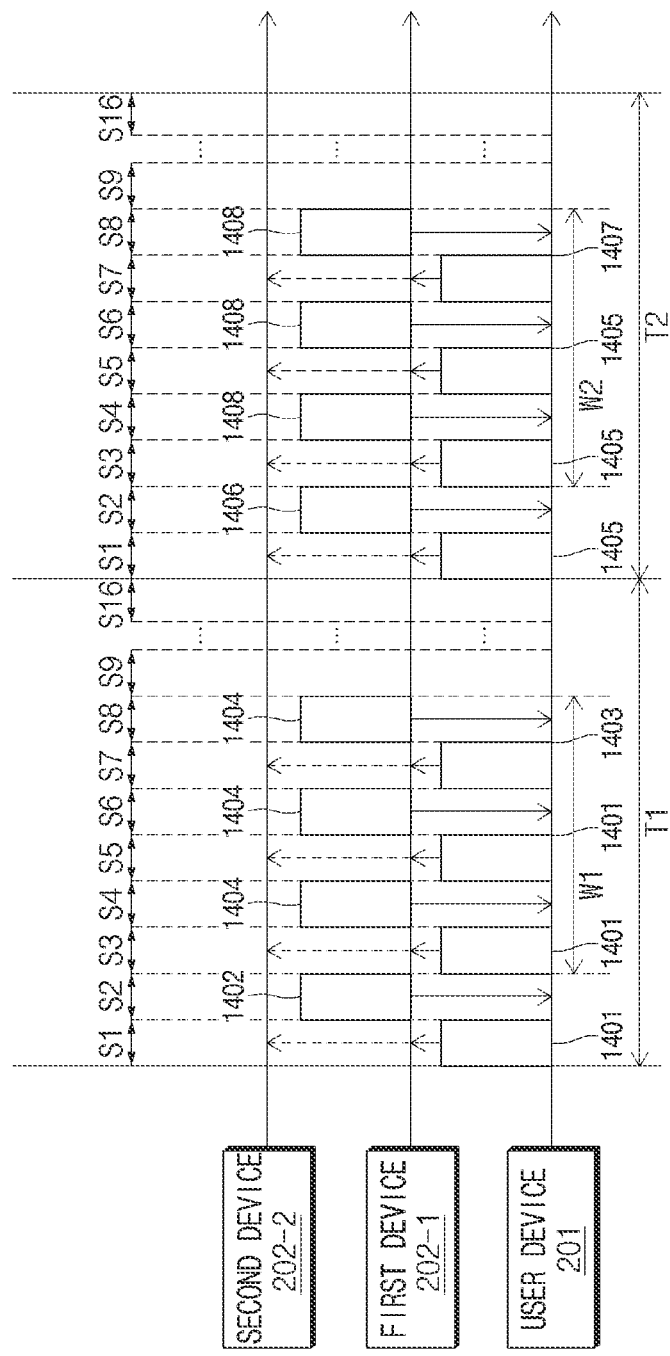
FIG. 14 is a diagram illustrating example packet exchange by transmitting additional data by a first device according to various embodiments.

FIG. 14 is a diagram illustrating example packet exchange by transmitting additional data by a first device according to various embodiments.

In FIG. 14, the eSCO link between the user device 201 and the first device 202-1 may be configured to have, for example, 16-slot transmission/reception period TeSCO (e.g., T1 or T2) and 6-slot retransmission window WeSCO (e.g., W1 or W2). Although the user device 201 and the first device 202-1 are illustrated as exchanging data using a single slot, various embodiments of the present disclosure are not limited thereto. In the present example, a retransmission window (e.g., W1 or W2) may include a third time slot S3, a fourth time slot S4, a fifth time slot S5, a sixth time slot S6, a seventh time slot S7, and an eighth time slot S8. Furthermore, although the user device 201 is regarded as a master device of the eSCO link in FIG. 14, various embodiments of the present disclosure are not limited thereto.

According to an embodiment, the first device 202-1 and the user device 201 may be configured to transmit additional data. On a first time slot S1 of a first transmission/reception interval T1, the user device 201 may transmit first data 1401 to the first device 202-1. For example, for more robust data transmission/reception, the first data 1401 may include audio data obtained in two time intervals prior to the first transmission/reception interval T1. For example, the first data 1401 may include audio data V0 and audio data V1 that is subsequent to the audio data V0 in a time domain. A size of each of the audio data V0 and the audio data V1 may correspond to one transmission/reception interval (T1 or T2). For example, when a size of data (e.g., payload) transmitted from the user device 210 is 60 bytes, the first data 1401 may include 30-byte audio data V0 and 30-byte audio data V1.

On a second time slot S2 of the first transmission/reception interval T1, the first device 202-1 may transmit second data 1402. In order to increase a probability of reception through data retransmission, for example, the second data 1402 may include NACK information. For example, even if the first data 1401 is received, the first device 202-1 may transmit the second data 1402 including NACK information. For another example, the user device 201 may be configured to repeatedly transmit data a specified number of times even if the second data 1402 includes ACK information.

For example, the second data 1402 may include audio data Vm1 and audio data Vs0. For example, the audio data Vm1 may include audio data obtained through a first microphone of the first device 202-1. The audio data Vs0 may include audio data that is obtained through the second microphone of the first device 202-1 and is prior to the audio data Vm1 in a time domain.

On a third time slot S3 and fifth time slot S5 of the first transmission/reception interval T1, the user device 201 may retransmit the first data 1401. On a fourth time slot S4, sixth time slot S6, and eighth time slot S8, the first device 202-1 may transmit fourth data 1404 including additional data for the second data 1402. For example, the fourth data 1404 may include additional data for the audio data Vm1 and additional data for the audio data Vs0.

On a seventh time slot S7 of the first transmission/reception interval T1, the user device 201 may transmit third data 1403 including additional data for the first data 1401. For example, the third data 1403 may include additional data for the audio data V0 and/or additional data for the audio data V1.

Data transmission/reception in the second transmission/reception interval T2 may refer to data transmission/reception in the first transmission/reception interval T1. For example, fifth data 1405 may include audio data V1 and audio data V2 that is subsequent to the audio data V1 in a time domain. Seventh data 1407 may include additional data for the audio data V1 and additional data for the audio data V2. Sixth data 1406 may include audio data Vm2 and audio data Vs1. For example, the audio data Vm2 may include audio data that is subsequent to the audio data Vm1 and obtained through the first microphone of the first device 202-1. The audio data Vs1 may include time-domain audio data that is obtained through the second microphone of the first device 202-1 and corresponds to the audio data Vm1. Eighth data 1408 may include additional data for the sixth data 1406. For example, the eighth data 1408 may include additional data for the audio data Vm2 and additional data for the audio data Vs1.

According to an embodiment, when there is no additional data for the first data 1401 (e.g., audio data V0, audio data V2), the user device 201 may retransmit the first data 1401 on a seventh time slot S7. For example, the user device 201 may repeatedly retransmit the first data 1401 on transmission slots (e.g., S3, S5, S7) of the first retransmission window W1. According to an embodiment, when there is no additional data for the second data 1402, the user device 201 may repeatedly retransmit the first data 1401. For example, the user device 201 may repeatedly retransmit the first data 1401 on transmission slots (e.g., S4, S6, S8) of the first retransmission window W1.

With regard to FIG. 14, although it has been described that the first device 202-1 and the user device 201 transmit additional data, embodiments of the present disclosure are not limited thereto. For example, transmission of additional data (e.g., the third data 1403 and the seventh data 1407) by the user device 201 may be skipped. For another example, the second device 202-2 may be configured to transmit additional data using at least one time slot of a retransmission window, as described below with reference to FIG. 16.

Although FIG. 14 illustrates that the first device 202-1 transmits obtained audio data (e.g., the second data 1402 and/or the sixth data 1406), embodiments of the present disclosure are not limited thereto. For example, as described below with reference to FIGS. 19 and 20, the second device 202-2 may transmit audio data. The user device 201, the first device 202-1, and/or the second device 202-2 may dynamically determine and/or negotiate about a device that is to transmit audio data and/or additional data.

Figure 15:
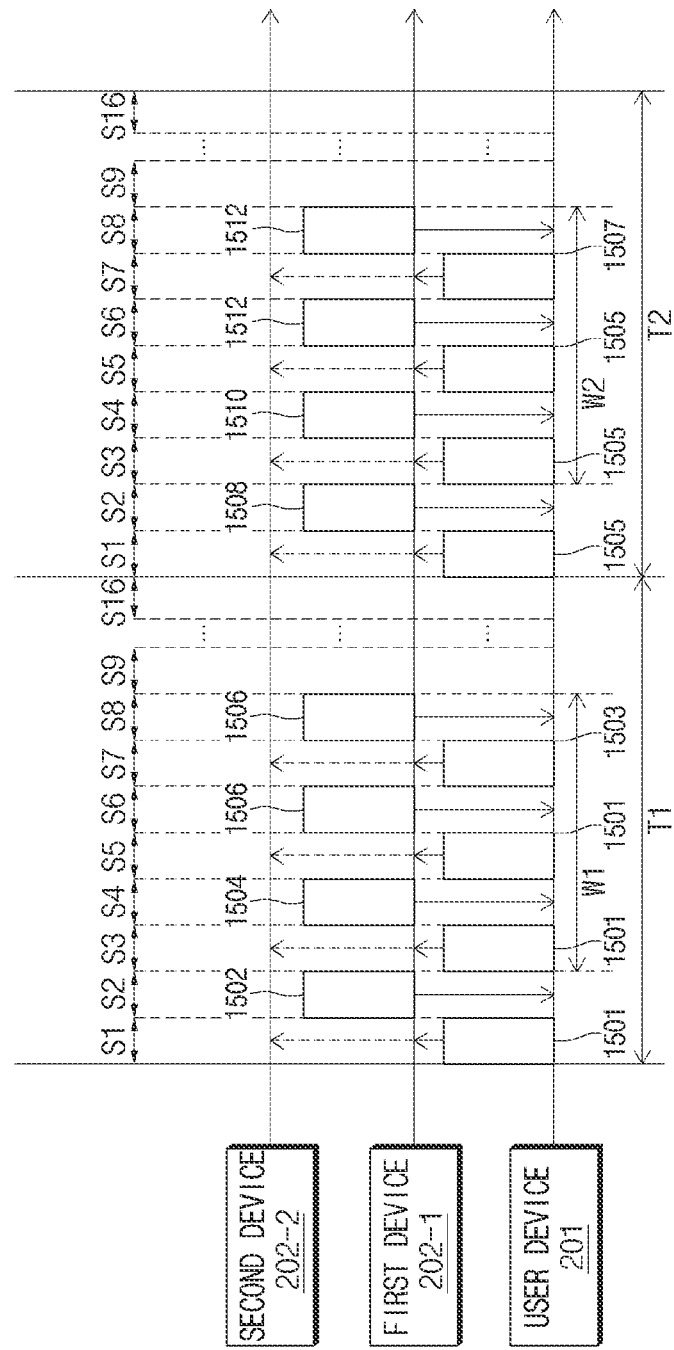
FIG. 15 is a diagram illustrating example packet exchange by transmitting additional data by a first device according to various embodiments.

FIG. 15 is a diagram illustrating example packet exchange by transmitting additional data by a first device according to various embodiments.

With regard to FIG. 14, a method has been described, in which the first device 202-1 transmits audio data of two time intervals and two audio channels using one packet. According to an embodiment, the first device 202-1 may transmit audio data of two time intervals of one audio channel using one packet. For example, the first device 202-1 may include at least two microphones. The at least two microphones may include a first microphone and/or a second microphone.

In FIG. 15, the eSCO link between the user device 201 and the first device 202-1 may be configured to have, for example, 16-slot transmission/reception period TeSCO (e.g., T1 or T2) and 6-slot retransmission window WeSCO (e.g., W1 or W2). Although the user device 201 and the first device 202-1 are illustrated as exchanging data using a single slot, various embodiments of the present disclosure are not limited thereto. In the present example, a retransmission window (e.g., W1 or W2) may include a third time slot S3, a fourth time slot S4, a fifth time slot S5, a sixth time slot S6, a seventh time slot S7, and an eighth time slot S8. Furthermore, although the user device 201 is regarded as a master device of the eSCO link in FIG. 15, various embodiments of the present disclosure are not limited thereto.

On a first time slot S1 of a first transmission/reception interval T1, the user device 201 may transmit first data 1501. For example, for more robust data transmission/reception, the first data 1501 may include audio data obtained in two time intervals prior to the first transmission/reception interval T1. For example, the first data 1501 may include audio data V0 and audio data V1 that is subsequent to the audio data V0 in a time domain. Each of the audio data V0 and the audio data V1 may have a length corresponding to one transmission/reception interval (T1 or T2).

On a second time slot S2 of the first transmission/reception interval T1, the first device 202-1 may transmit second data 1502. For example, the second data 1502 may include NACK information.

For example, the second data 1502 may include audio data Vm1 and audio data Vm0. For example, the audio data Vm1 may include audio data obtained through the first microphone of the first device 202-1. The audio data Vm0 may include audio data that is obtained through the first microphone of the first device 202-1 and is prior to the audio data Vm1 in a time domain.

On a third time slot S3 and fifth time slot S5 of the first transmission/reception interval T1, the user device 201 may retransmit the first data 1501. On a fourth time slot S4 of the first transmission/reception interval T1, the first device 202-1 may transmit fourth data 1504. For example, the fourth data 1504 may include audio data Vs1 and audio data Vs0 as additional data for the second data 1502. For example, the audio data Vs1 may be audio data obtained by the second microphone of the first device 202-1 in the same time domain region as the audio data Vm1. The audio data Vs0 may be audio data that is obtained through the second microphone of the first device 202-1 and is prior to the audio data Vs1 in a time domain.

On a sixth time slot S6 and eighth time slot S8 of the first transmission/reception interval T1, the first device 202-1 may transmit sixth data 1506 including additional data for the second data 1502. For example, the sixth data 1506 may include additional data (e.g., an audio enhancement parameter or audio data obtained through an audio channel that is different from that of the audio data Vm1) for the audio data Vm0 and additional data (e.g., an audio enhancement parameter or audio data obtained through an audio channel that is different from that of the audio data Vm0) for the audio data Vm0.

On a seventh time slot S7 of the first transmission/reception interval T1, the user device 201 may transmit third data 1503 including additional data for the first data 1501. For example, the third data 1503 may include additional data for the audio data V0 and additional data (e.g., audio enhancement parameter) for the audio data V1.

Data transmission/reception in the second transmission/reception interval T2 may refer to data transmission/reception in the first transmission/reception interval T1. For example, fifth data 1505 may include audio data V1 and audio data V2 that is subsequent to the audio data V1 in a time domain. Seventh data 1507 may include additional data for the audio data V1 and additional data for the audio data V2. Eighth data 1508 may include audio data Vm2 and audio data Vm1. For example, the audio data Vm2 may include audio data that is subsequent to the audio data Vm1 and obtained through the first microphone of the first device 202-1. Tenth data 1510 may include audio data Vs1 and audio data Vs2. For example, the audio data Vs2 may be audio data that is obtained through the second microphone of the first device 202-1 and is subsequent to the audio data Vs1 in a time domain. Twelfth data 1512 may include additional data for the eighth data 1508. For example, the twelfth data 1512 may include additional data for the audio data Vm1 and additional data for the audio data Vm2.

With regard to FIG. 15, although it has been described that the first device 202-1 transmits audio data of two time intervals of one audio channel using one packet, embodiments of the present disclosure are not limited thereto. Hereinafter, the first device 202-1 may be configured to transmit audio data of one channel corresponding to one time interval using one packet. In this case, instead of including audio data of a plurality of time intervals in one packet, a packet of additional data may include audio data corresponding to another time interval. For example, the second data 1502 may include only the audio data Vm1, and the fourth data 1504 may include only the audio data Vs0. Furthermore, the sixth data 1506 may include additional data (e.g., additional data for the audio data Vm1) for the second data 1502. For another example, the eighth data 1508 may include only the audio data Vm2, and the tenth data 1510 may include only the audio data Vs1. Furthermore, the twelfth data 1512 may include additional data for the audio data Vm2.

With regard to FIG. 15, although it has been described that the first device 202-1 and the user device 201 transmit additional data, embodiments of the present disclosure are not limited thereto. For example, transmission of additional data (e.g., the third data 1503 and the seventh data 1507) by the user device 201 may be skipped. For another example, the second device 202-2 may be configured to transmit additional data using at least one time slot of a retransmission window, as described below with reference to FIG. 16.

Although FIG. 15 illustrates that the first device 202-1 transmits obtained audio data (e.g., the second data 1502 and/or the eighth data 1508), embodiments of the present disclosure are not limited thereto. For example, as described below with reference to FIGS. 19 to 22, the second device 202-2 may transmit audio data. The user device 201, the first device 202-1, and/or the second device 202-2 may dynamically determine and/or negotiate about a device that is to transmit audio data and/or additional data.

Figure 16:
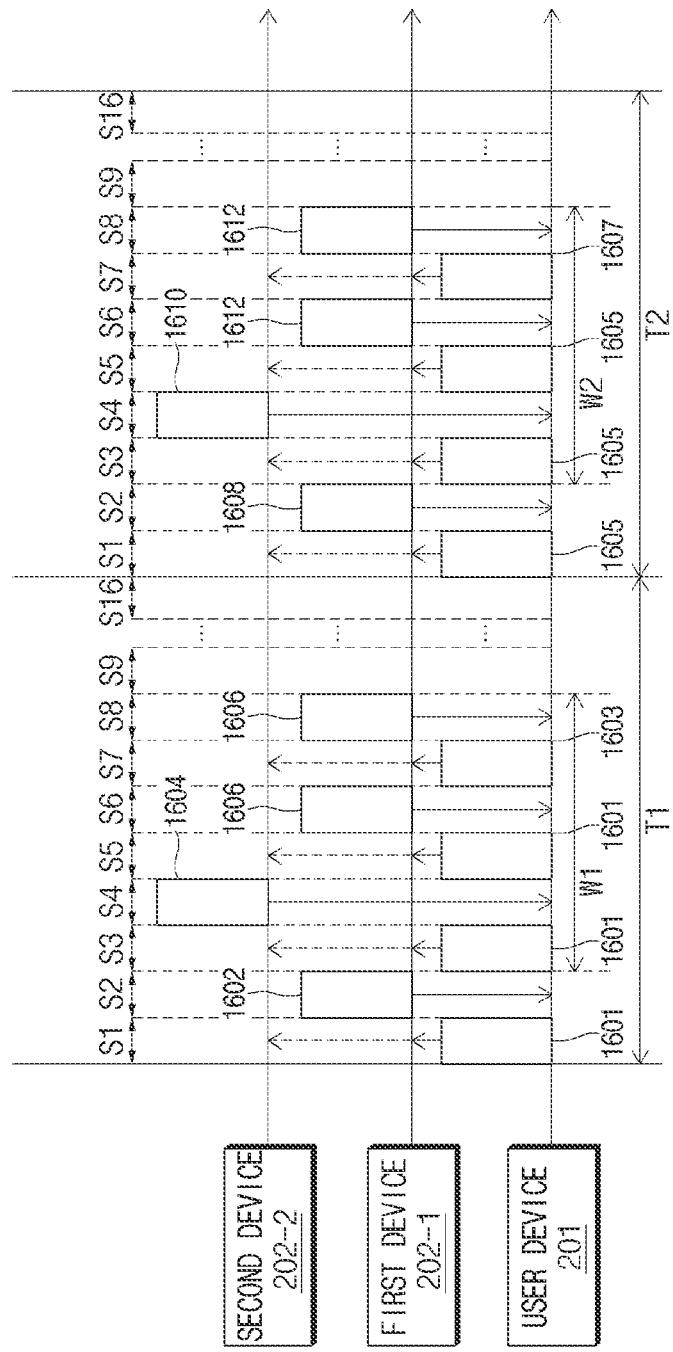
FIG. 16 is a diagram illustrating example packet exchange by transmitting additional data by a second device according to various embodiments.

Although FIG. 16 illustrates that the first device 202-1 transmits obtained audio data (e.g., the second data 1602 and/or the eighth data 1608), embodiments of the present disclosure are not limited thereto. For example, as described below with reference to FIGS. 19 to 22, the second device 202-2 may transmit audio data. The user device 201, the first device 202-1, and/or the second device 202-2 may dynamically determine and/or negotiate about a device that is to transmit audio data and/or additional data.

FIG. 16 is a diagram illustrating example packet exchange by transmitting additional data by a second device according to various embodiments.

In FIG. 16, the eSCO link between the user device 201 and the first device 202-1 may be configured to have, for example, 16-slot transmission/reception period TeSCO (e.g., T1 or T2) and 6-slot retransmission window WeSCO (e.g., W1 or W2). Although the user device 201, the first device 202-1, and the second device 202-2 are illustrated as exchanging data using a single slot, embodiments of the present disclosure are not limited thereto. Furthermore, although the user device 201 is regarded as a master device of the eSCO link in FIG. 16, embodiments of the present disclosure are not limited thereto.

In the examples of FIG. 16, the first device 202-1, the second device 202-2, and the user device 201 may be configured to transmit additional data. Hereinafter, for convenience, three examples will be described with reference to FIG. 16.

In a first example, the first device 202-1, the second device 202-2, and the user device 201 may be configured to transmit audio data of a plurality of time intervals for one audio channel using one packet.

First data 1601 may include audio data obtained in two time intervals prior to a first transmission/reception interval T1. For example, the first data 1601 may include audio data V0 and audio data V1 that is subsequent to the audio data V0 in a time domain.

On a second time slot S2 of the first transmission/reception interval T1, the first device 202-1 may transmit second data 1602. For example, the second data 1602 may include NACK information. The second data 1602 may include audio data Vm1 and audio data Vm0. For example, the audio data Vm1 may include audio data obtained through the first microphone of the first device 202-1. The audio data Vm0 may include audio data that is obtained through the first microphone of the first device 202-1 and is prior to the audio data Vm1 in a time domain.

On a third time slot S3 and fifth time slot S5 of the first transmission/reception interval T1, the user device 201 may retransmit the first data 1601.

On a fourth time slot S4 of the first transmission/reception interval T1, the second device 202-2 may transmit fourth data 1604. The fourth data 1604 may include audio data Vm1' and audio data Vm0'. For example, the audio data Vm1' may include audio data obtained through the first microphone of the second device 202-2. The audio data Vm0' may include audio data that is obtained through the first microphone of the second device 202-2 and is prior to the audio data Vm1' in a time domain.

On a sixth time slot S6 and eighth time slot S8 of the first transmission/reception interval T1, the first device 202-1 may transmit sixth data 1606. The sixth data 1606 may include additional data for the audio data Vm1 included in the second data 1602 and additional data for the audio data Vm0.

For example, fifth data 1605 of the second transmission/reception interval T2 may include audio data V1 and audio data V2 that is subsequent to the audio data V1 in a time domain. Eighth data 1608 may include audio data Vm1 and audio data Vm2. The audio data Vm2 may be audio data that is obtained through the first microphone of the first device 202-1 and is subsequent to the audio data Vm1. Seventh data 1607 may include additional data for the audio data V1 and additional data for the audio data V2. Tenth data 1610 may include audio data Vm1' and audio data Vm2'. For example, the audio data Vm2' may be audio data that is obtained through the first microphone of the second device 202-2 and is subsequent to the audio data Vm1'. Twelfth data 1612 may include additional data for the audio data Vm1 included in the eighth data 1608 and additional data for the audio data Vm2. According to an embodiment, the user device 201 may generate audio data based on the second data 1602, the fourth data 1604, and the sixth data 1606 of the first transmission/reception interval T1 and the tenth data 1610 of the second transmission/reception interval T2. For example, the user device 201 may generate robust audio data based on data transmitted from different electronic devices (e.g., the first device 202-1 or the second device 202-2) and in different transmission/reception intervals (e.g., T1 or T2).

In a second example, the user device 201 may be configured to transmit audio data of a plurality of time intervals for one audio channel using one packet. The first device 202-1 and the second device 202-2 may be configured to transmit audio data of one time interval for one audio channel using one packet. In this case, data transmitted from the first device 202-1 and the second device 202-2 in one time interval may be audio data corresponding to different time intervals.

In this case, data transmitted from the user device 201 may be the same as that of the first example. In the second example, the second data 1602 may include audio data Vm1, and the fourth data 1604 may include audio data Vm0'. The sixth data 1606 may include additional data for the audio data Vm1 included in the second data 1602. For example, the eighth data 1608 may include audio data Vm2, and the tenth data 1610 may include Vm1'. The twelfth data 1612 may include additional data for the audio data Vm2 included in the eighth data 1608. According to an embodiment, the user device 201 may generate audio data based on the second data 1602 and the sixth data 1606 of the first transmission/reception interval T1 and the tenth data 1610 of the second transmission/reception interval T2. For example, the user device 201 may generate robust audio data based on data transmitted from different electronic devices (e.g., the first device 202-1 or the second device 202-2) and in different transmission/reception intervals (e.g., T1 or T2).

In a third example, the user device 201 may be configured to transmit audio data of a plurality of time intervals for one audio channel using one packet. The first device 202-1 and the second device 202-2 may be configured to transmit pieces of audio data of a plurality of time intervals for a plurality of audio channels using one packet.

In this case, data transmitted from the user device 201 may be the same as that of the first example. In the third example, the second data 1602 may include audio data Vm1 and audio data Vs0. The audio data Vs0 may be audio data that is prior to the audio data Vm1 obtained using the first microphone of the first device 202-1 in a time domain, and is obtained using the second microphone of the first device 202-1. The fourth data 1604 may include Vm1' and Vs0'. The audio data Vm1' may be audio data obtained by the first microphone of the second device 202-2 in the same time region as the audio data Vm1. The audio data Vs0' may be audio data obtained by the second microphone of the second device 202-2 in the same time region as the audio data Vs0. For example, in the third example, one packet transmitted from the first device 202-1 or the second device 202-2 may include audio data of two time regions, and pieces of the audio data may also respectively correspond to different audio channels. The sixth data 1606 may include additional data for the audio data Vm1 and additional data for the audio data Vs0.

For example, the eighth data 1608 may include audio data Vm2 and audio data Vs1, and the tenth data 1610 may include audio data Vm2' and audio data Vs1'. The twelfth data 1612 may include additional data for the audio data Vm2 and additional data for the audio data Vs1.

According to an embodiment, the user device 201 may generate audio data based on the second data 1602, the fourth data 1604, and the sixth data 1606 of the first transmission/reception interval T1 and the eighth data 1608, the tenth data 1610, and the twelfth data 1612 of the second transmission/reception interval T2. For example, the user device 201 may generate robust audio data based on data transmitted from different electronic devices (e.g., the first device 202-1 or the second device 202-2) and in different transmission/reception intervals (e.g., T1 or T2).

Figure 17:
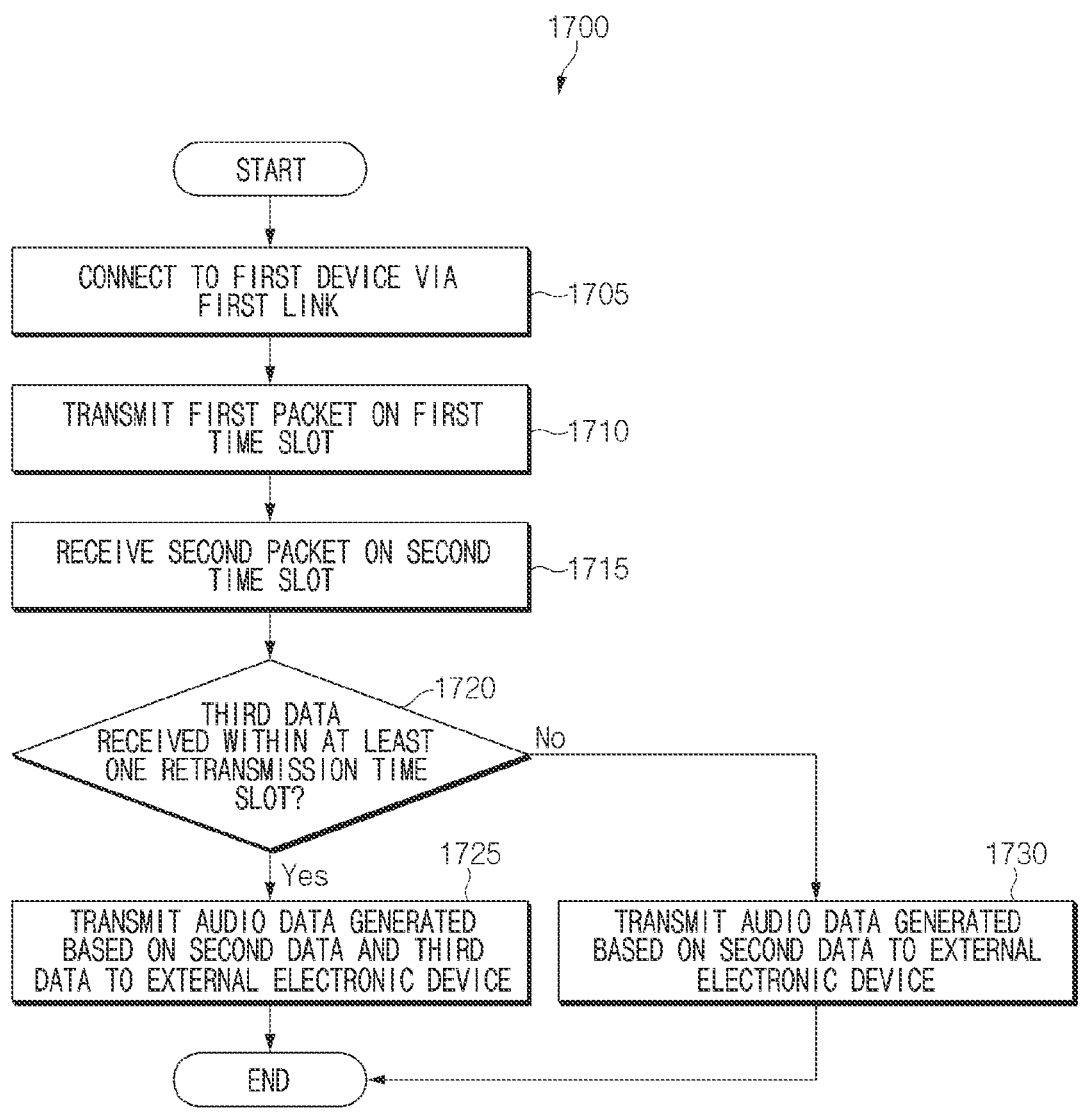
FIG. 17 is a flowchart illustrating an example audio data transmission method of a user device according to various embodiments.

FIG. 17 is a flowchart 1700 illustrating an example audio data transmission method of a user device according to various embodiments.

In operation 1705, the user device 201 may be connected to the first device 202-1 via the first link 205. The user device 201 may create an eSCO link based on a synchronous connection protocol through the first link 205.

In operation 1710, the user device 201 may transmit a first packet on a first time slot among a plurality of time slots of one transmission/reception interval of the eSCO link. For example, the first packet may include first audio data.

In operation 1715, the user device 201 may receive a second packet including second audio data from the first device 202-1 on a second time slot among the plurality of time slots. If the second packet is not received in operation 1715, the user device 201 may transmit information indicting NACK on a third time slot subsequent to the second time slot in response to non-reception of the second packet.

In operation 1720, the user device 201 may determine whether third audio data is received within at least one retransmission time slot. For example, the user device 201 may attempt to receive the third audio data within at least one retransmission time slot among the plurality of time slots. For example, the third audio data may be audio data of an audio channel different from that of the second audio data. For example, the third audio data may be audio data obtained by a second device different from the first device. For example, the third audio data may be audio data of an interval that is different from that of the second audio data in a time domain.

If the third audio data is received (e.g., operation 1720-Y), the user device 201 may transmit, to an external electronic device, audio data generated based on the second audio data and the third audio data in operation 1725. The user device 201 may generate the audio data by enhancing sound quality of the second audio data using the third audio data. For another example, if the second packet fails to be received in operation 1715, and the second packet also fails to be received within a retransmission window, the user device 201 may transmit, to an external electronic device, audio data generated based on only the third audio data.

If the third audio data is not received (e.g., operation 1720-N), the user device 201 may transmit, to an external electronic device, audio data generated based on the second audio data in operation 1730. For another example, if the second packet fails to be received in operation 1715, but the second packet is successfully received within a retransmission window, the user device 201 may transmit, to an external electronic device, audio data generated based on only the second audio data.

Figure 18:
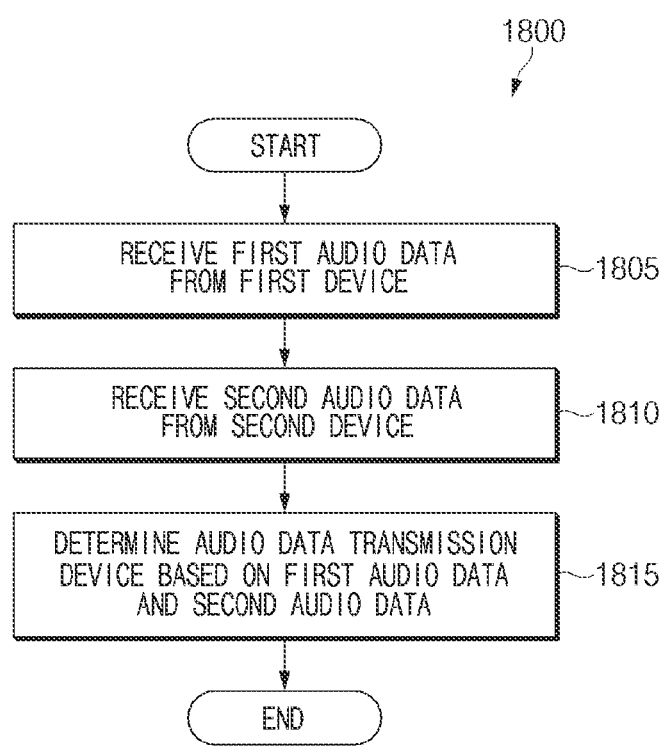
FIG. 18 is a flowchart illustrating an audio data transmission device changing method of a user device according to an embodiment.

FIG. 18 is a flowchart 1800 illustrating an audio data transmission device changing method of a user device according to an embodiment.

According to an embodiment, the user device 201 may determine a device that is to transmit audio data (hereinafter referred to as an audio data transmission device) before (e.g., the second time slot S2 of FIGS. 8A, 8B, 12, 13, 14, 15, and 16) the retransmission window WeSCO among the first device 202-1 and the second device 202-2. For example, the user device 201 may determine a device that is to transmit audio data when negotiating about an additional data transfer method (e.g., operation 920 of FIG. 9). The user device 201 may determine an audio data transmission device periodically or dynamically while being connected to the first device 202-1 and/or the second device 202-2.

In operation 1805, the user device 201 may receive first audio data from the first device 202-1. The first audio data may be audio data obtained using at least one microphone (e.g., the audio reception circuit 481) of the first device 202-1. The first audio data may be high-quality audio data among pieces of audio data obtained using a plurality of microphones of the first device 202-1. The first audio data may be audio data having sound quality improved using pieces of audio data obtained using the plurality of microphones of the first device 202-1. The first audio data may include quality information (e.g., noise level) about audio data obtained using at least one microphone of the first device 202-1. The user device 201 may receive the first audio data via the first link 205.

In operation 1810, the user device 201 may receive second audio data from the second device 202-2. The second audio data may be audio data obtained using a microphone (e.g., the audio reception circuit 482) of the second device 202-2. The second audio data may be high-quality audio data among pieces of audio data obtained using a plurality of microphones of the second device 202-2. The second audio data may be audio data having sound quality improved using pieces of audio data obtained using the plurality of microphones of the second device 202-2. The second audio data may include quality information (e.g., noise level) about audio data obtained using at least one microphone of the second device 202-2. The user device 201 may receive the second audio data via the first link 205 or the second link 210.

In operation 1815, the user device 201 may determine an audio data transmission device based on the first audio data and the second audio data. The user device 201 may determine high-quality audio data among the first audio data and the second audio data instead of determining an audio data transmission device. The user device 201 may transmit information about a determined audio data transmission device or audio data to the first device 202-1 and/or the second device 202-2.

For example, the user device 201 may determine an audio data transmission device or audio data based on a level of noise (e.g., wind noise). In general, since wind noise has directivity, the user device 201 may determine an audio data transmission device or audio data that undergoes relatively low wind noise based on a noise level of audio data.

The user device 201 may determine an audio data transmission device (or audio data) by comparing noise with a threshold. For example, when the noise level of the first audio data is less than the threshold, and the noise level of the second audio data is at least the threshold, the user device 201 may determine that the first device 201-1 should transmit audio data and the second device 202-2 should transmit additional data. For another example, when the noise level of the first audio data is at least the threshold, and the noise level of the second audio data is less than the threshold, the user device 201 may determine that the second device 201-2 should transmit audio data and the first device 202-1 should transmit additional data In another embodiment, when the noise levels of both of the first audio data and the second audio data are at least the threshold, the user device 201 may determine that a specified device (e.g., the first device 202-1 or the second device 202-2) should transmit audio data. In another embodiment, when the noise levels of both of the first audio data and the second audio data are less than the threshold, the user device 201 may determine that a specified device (e.g., the first device 202-1 or the second device 202-2) should transmit audio data. For another example, when only the first audio data has a noise level that is less than the threshold, the user device 201 may determine that the first device 202-1 should determine audio data and the second device 202-2 should not transmit additional data and audio data.

If an audio data transmission device (or audio data) is determined, the user device 201 may transmit a signal indicating the audio data transmission device (or audio data) via the first link 205.

In the case of changing an audio data transmission device due to determination of another audio data transmission device, the user device 201 may transmit a signal instructing change of an audio data transmission device via the first link 205. The first device 202-1 and/or the second device 202-2 may change a device that is to transmit audio data, in response to reception of the signal. For example, the first device 202-1 and the second device 202-2 may perform a role change.

Although FIG. 18 illustrates that the user device 201 determines an audio data transmission device based on a noise level, embodiments of the present disclosure are not limited thereto. For example, the user device 201 may determine an audio data transmission device based on battery states of the first device 202-1 and the second device 202-2. If the battery state of the first device 202-1 is less than a threshold level, the user device 201 may determine the second device 202-2 as an audio data transmission device. If the battery state of the second device 202-2 is less than the threshold level, the user device 201 may determine the first device 202-1 as an audio data transmission device. For another example, the user device 201 may determine not only an audio data transmission device but also whether to transmit additional data. The user device 201 may determine an audio data transmission device and whether to transmit additional data based on a battery state and a noise level.

In the example of FIG. 18, it may be assumed that the first device 202-1 and the second device 202-2 are worn by the user. For example, when only the first device 202-1 is worn by the user, the user device 201 may determine a microphone to be used for audio data transmission among the plurality of microphones of the first device 202-1. The user device 201 may determine a microphone to be used for audio data transmission by comparing first audio data (e.g., data obtained through a first microphone of the first device 202-1) and second audio data (e.g., data obtained through a second microphone of the first device 202-2) from the first device 202-1.

Figure 19:
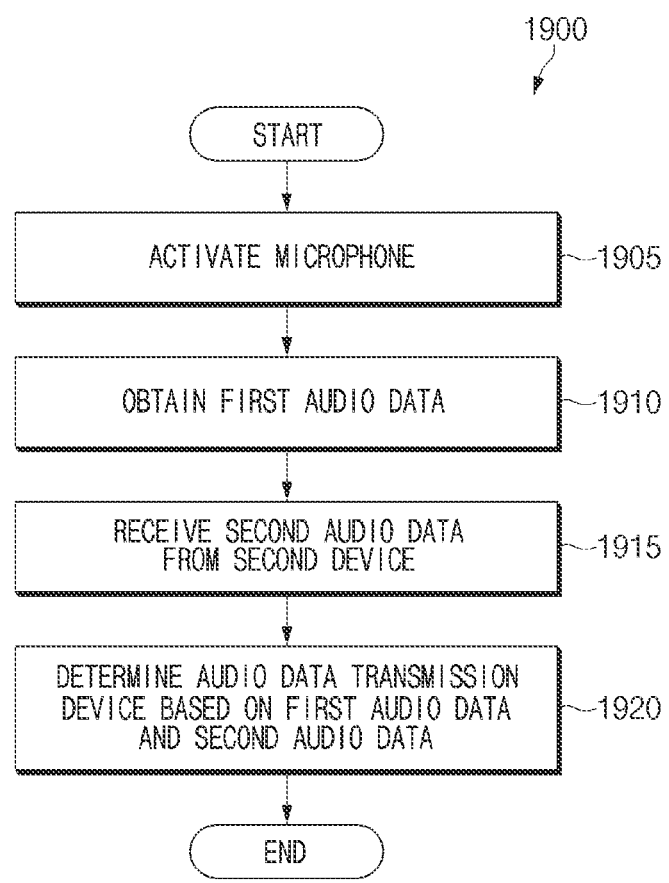
FIG. 19 is a flowchart illustrating an exemplary audio data transmission device changing method of a first device according to an embodiment.

FIG. 19 is a flowchart 1900 illustrating an audio data transmission device changing method of a first device according to an embodiment.

According to an embodiment, the first device 202-1 may determine a device that is to transmit audio data (hereinafter referred to as an audio data transmission device) before (e.g., the second time slot S2 of FIGS. 8A, 8B, 12, 13, 14, 15, and 16) the retransmission window WeSCO among the first device 202-1 and the second device 202-2. For example, the first device 202-1 may determine an audio data transmission device when negotiating about an additional data transfer method (e.g., operation 1035 of FIG. 10). The first device 202-1 may determine an audio data transmission device periodically or dynamically while being connected to the user device 201.

In operation 1905, the first device 202-1 may activate a microphone (e.g., the audio reception circuit 481 of FIG. 4). The first device 202-1 may determine whether the first device 202-1 is worn by the user using a sensor (e.g., a proximity sensor). If the first device 202-1 is worn by the user, the first device 202-1 may activate the microphone. The first device 202-1 may activate the microphone when connected to the user device 201 based on a specified service (e.g., hands free profile). The first device 202-1 may activate the microphone if the first device 202-1 is worn by the user and the first device 202-1 is connected to the user device 201 based on a specified service.

In operation 1910, the first device 202-1 may obtain first audio data using the activated microphone. The first device 202-1 may obtain the first audio data in order to transmit data to the user device 201 or may obtain the first audio data in order to determine an audio data transmission device. The first audio data may be audio data obtained using at least one microphone (e.g., the audio reception circuit 481) of the first device 202-1. The first audio data may be high-quality audio data among pieces of audio data obtained using a plurality of microphones of the first device 202-1. The first audio data may be audio data having sound quality improved using pieces of audio data obtained using the plurality of microphones of the first device 202-1. The first audio data may include quality information (e.g., noise level) about audio data obtained using at least one microphone of the first device 202-1.

In operation 1915, the first device 202-1 may receive second audio data from the second device 202-2. For example, the first device 202-1 may receive the second audio data via the third link 215. For another example, the first device 202-1 may receive the second audio data transmitted from the second device 202-2 to the user device 201 via the first link 205. The second audio data may be audio data obtained using a microphone (e.g., the audio reception circuit 482) of the second device 202-2. The second audio data may be audio data obtained using at least one microphone (e.g., the audio reception circuit 481) of the second device 202-2. The second audio data may be high-quality audio data among pieces of audio data obtained using a plurality of microphones of the second device 202-2. The second audio data may be audio data having sound quality improved using pieces of audio data obtained using the plurality of microphones of the second device 202-2. The second audio data may include quality information (e.g., noise level) about audio data obtained using at least one microphone of the second device 202-2.

In operation 1920, the first device 202-1 may determine an audio data transmission device based on the first audio data and the second audio data. For example, the first device 202-1 may determine an audio data transmission device based on a level of noise (e.g., wind noise). In the case where the first audio data and the second audio data include noise level information, the first device 202-1 may determine an audio data transmission device by comparing pieces of the noise level information. The first device 202-1 may determine an audio data transmission device using a method similar to the method described above with regard to operation 1815 of FIG. 18.

The first device 202-1 may transmit information indicating a determined audio data transmission device via the first link 205 or the third link 215. The first device 202-1 and/or the second device 202-2 may change a device that is to transmit audio data, in response to reception of the signal. For example, the first device 202-1 and the second device 202-2 may perform a role change.

Although FIG. 19 illustrates that the first device 202-1 determines an audio data transmission device based on a noise level, embodiments of the present disclosure are not limited thereto. For example, as described above with reference to FIG. 18, the first device 202-1 may determine an audio data transmission device based on battery states of the first device 202-1 and the second device 202-2. The first device 202-1 may determine an audio data transmission device and whether to transmit additional data based on a battery state and a noise level.

Figure 20:
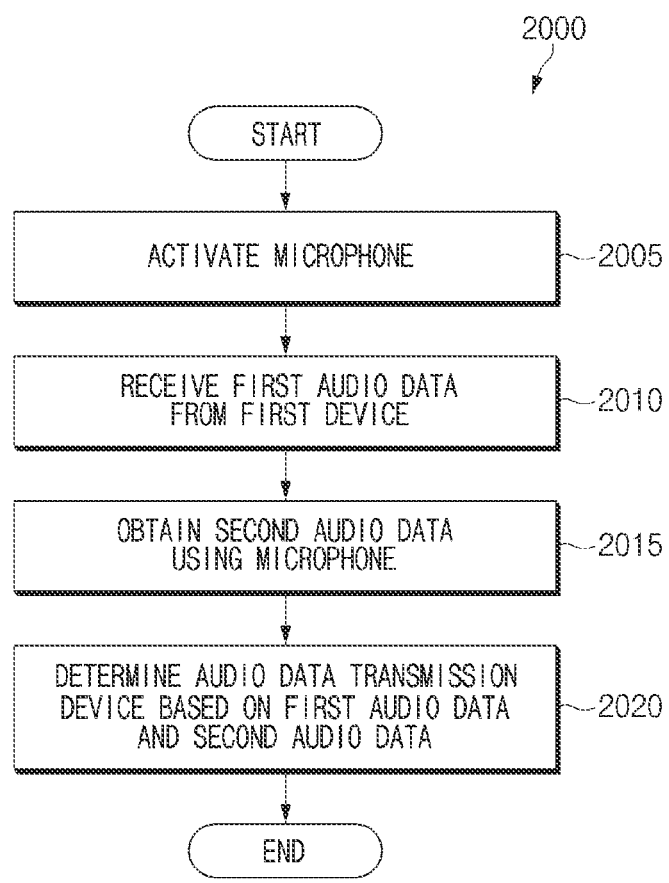
FIG. 20 is a flowchart illustrating an exemplary audio data transmission device changing method of a second device according to an embodiment.

FIG. 20 is a flowchart 2000 illustrating an audio data transmission device changing method of a second device according to an embodiment.

According to an embodiment, the second device 202-2 may determine a device that is to transmit audio data (hereinafter referred to as an audio data transmission device) before (e.g., the second time slot S2 of FIGS. 8A, 8B, 12, 13, 14, 15, and 16) the retransmission window WeSCO among the first device 202-1 and the second device 202-2. For example, the second device 202-2 may determine an audio data transmission device when negotiating about an additional data transfer method (e.g., operation 1035 of FIG. 10). The second device 202-2 may determine an audio data transmission device periodically or dynamically while being connected to the user device 201.

In operation 2005, the second device 202-2 may activate a microphone (e.g., the audio reception circuit 482 of FIG. 4). The second device 202-2 may determine whether the second device 202-2 is worn by the user using a sensor (e.g., a proximity sensor). If the second device 202-2 is worn by the user, the second device 202-2 may activate the microphone. The second device 202-2 may activate the microphone when connected to the user device 201 based on a specified service (e.g., hands free profile). The second device 202-2 may activate the microphone if the second device 202-2 is worn by the user and the second device 202-2 is connected to the user device 201 based on a specified service.

In operation 2010, the second device 202-2 may receive first audio data from the first device 202-1. For example, the second device 202-2 may receive the first audio data via the third link 215. For another example, the second device 202-2 may receive the first audio data transmitted from the first device 202-1 to the user device 201 via the first link 205. The first audio data may be audio data obtained using a microphone (e.g., the audio reception circuit 481) of the first device 202-1. The above descriptions provided with reference to FIG. 19 may be referred to with regard to the first audio data.

In operation 2015, the second device 202-2 may obtain second audio data using the activated microphone. The second device 202-2 may obtain the second audio data in order to transmit data to the user device 201 or may obtain the second audio data in order to determine an audio data transmission device. The above descriptions provided with reference to FIG. 19 may be referred to with regard to the second audio data.

In operation 2020, the second device 202-2 may determine an audio data transmission device based on the first audio data and the second audio data. For example, the second device 201 may determine an audio data transmission device based on a level of noise (e.g., wind noise). In the case where the first audio data and the second audio data include noise level information, the second device 202-2 may determine an audio data transmission device by comparing pieces of the noise level information. The second device 202-2 may determine an audio data transmission device using a method similar to the method described above with regard to operation 1815 of FIG. 18.

The second device 202-2 may transmit information indicating a determined audio data transmission device via the first link 205 or the third link 215. The first device 202-1 and/or the second device 202-2 may change a device that is to transmit audio data, in response to reception of the signal. For example, the first device 202-1 and the second device 202-2 may perform a role change.

Although FIG. 20 illustrates that the second device 202-2 determines an audio data transmission device based on a noise level, embodiments of the present disclosure are not limited thereto. For example, as described above with reference to FIG. 18, the second device 202-2 may determine an audio data transmission device based on battery states of the first device 202-1 and the second device 202-2. The second device 202-2 may determine an audio data transmission device and whether to transmit additional data based on a battery state and a noise level.

Figure 21:
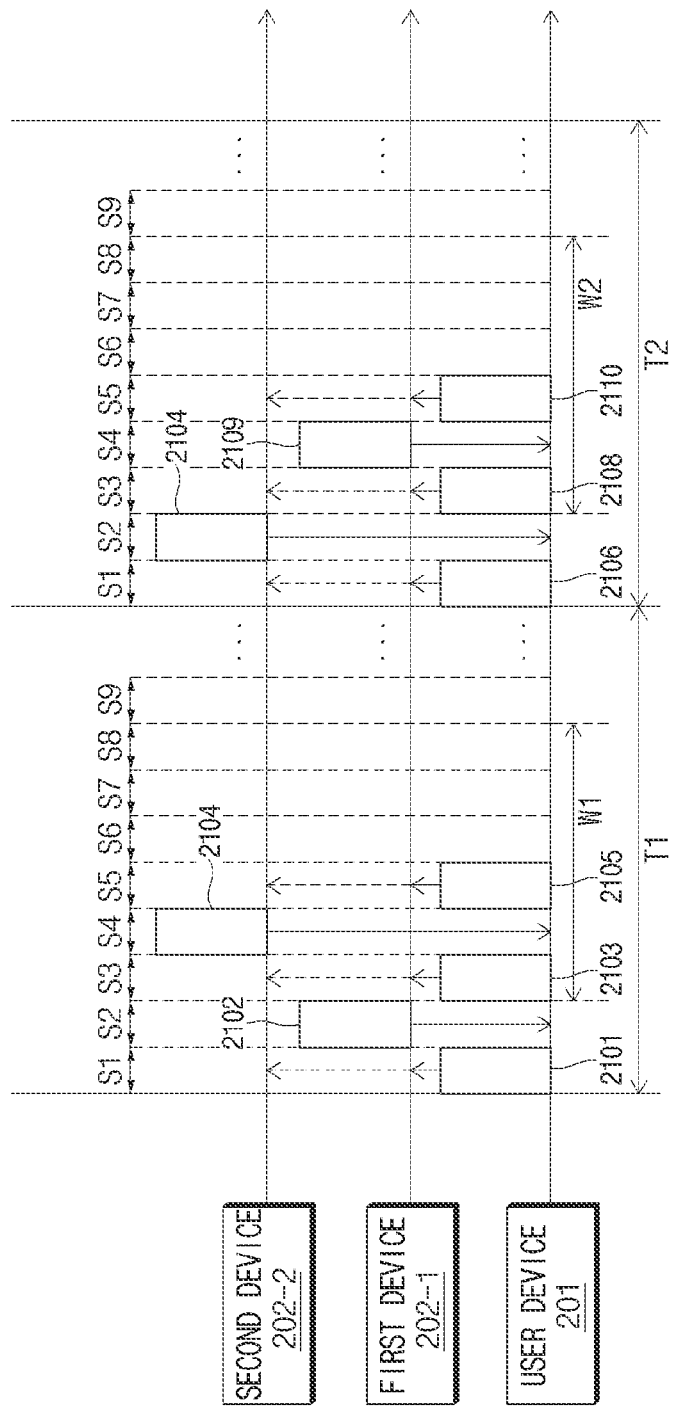
FIG. 21 is a diagram illustrating example packet exchange according to change of an audio data transmission device.

FIG. 21 illustrates an example of packet exchange according to change of an audio data transmission device.

In the example of FIG. 21, the first device 202-1 may be configured to transmit audio data, and the second device 202-2 may be configured to transmit additional data in a retransmission window.

The eSCO link (e.g., the first link 205) between the user device 201 and the first device 202-1 may be configured to have, for example, 16-slot transmission/reception window TeSCO (e.g., T1 or T2) and 4-slot retransmission window WeSCO (e.g., W1 or W2). In the present example, a retransmission window (e.g., W1 or W2) may include a third time slot S3, a fourth time slot S4, a fifth time slot S5, and a sixth time slot S6. Although the user device 201 and the first device 202-1 are illustrated as exchanging data using a single slot, various embodiments of the present disclosure are not limited thereto.

In an embodiment, on a first time slot S1 of a first transmission/reception interval T1, the user device 201 may transmit first data 2101 via the eSCO link generated with the first device 202-1. On a second time slot S2, the first device 202-1 may transmit second data 2102 including first audio data obtained by the first device 202-1 to the user device 201 via the eSCO link. In an example, the second data 2102 may further include ACK information about the first data 2101. On a first time slot (e.g., the third time slot S3) of a subsequent first retransmission window W1, the user device 201 may transmit third data 2103 including ACK for the second data 2102 to the first device 202-1 via the eSCO link.

On the fourth time slot S4 of the first transmission/reception interval T1, the second device 202-2 may transmit fourth data 2104 including additional data (e.g., second audio data) to the user device 201 via the eSCO link. The additional data may include information for enhancing the first audio data of the second data 2102. For example, the fourth data 2104 may include audio data of another channel obtained at the same time as the second audio data of the second data 2102. For example, the fourth data 2104 may include the second audio data obtained through a microphone of the second device 202-2.

On the fifth slot S5 of the first transmission/reception interval T1, the user device 201 may transmit fifth data 2105 via the eSCO link. The fifth data 2105 may include ACK information about the fourth data 2104.

In the example of FIG. 21, the first device 202-1, the second device 202-2, or the user device 201 may determine an audio data transmission device based on the first audio data and the second audio data. In the first transmission/reception interval T1, the second device 202-2 may be determined as an audio data transmission device. The first device 202-1 and the second device 202-2 may perform a role change.

On a first time slot S1 of a second transmission/reception interval T2, the user device 201 may transmit sixth data 2106 via the eSCO link. The sixth data 2106 may be continuation data of the first data 2101 stored by the user device 201 in a transmission buffer in order to be transmitted to the first device 202-1. On a second time slot S2, the second device 202-2 may transmit, via the eSCO link, seventh data 2107 including audio data obtained by the second device 202-2. The seventh data 2107 may further include ACK information about the sixth data 2106.

In response to reception of the seventh data 2107, the user device 201 may transmit eighth data 2108 including ACK information about the seventh data 2107. On the fourth time slot S4 of the second transmission/reception interval T2, the first device 202-1 may transmit ninth data 2109 including additional data to the user device 201. The ninth data 2109 may include additional data for adjusting the audio data included in the seventh data 2107. On the fifth time slot S5, the user device 201 may transmit 10th data 2110 including ACK information about the ninth data 2109.

Figure 22:
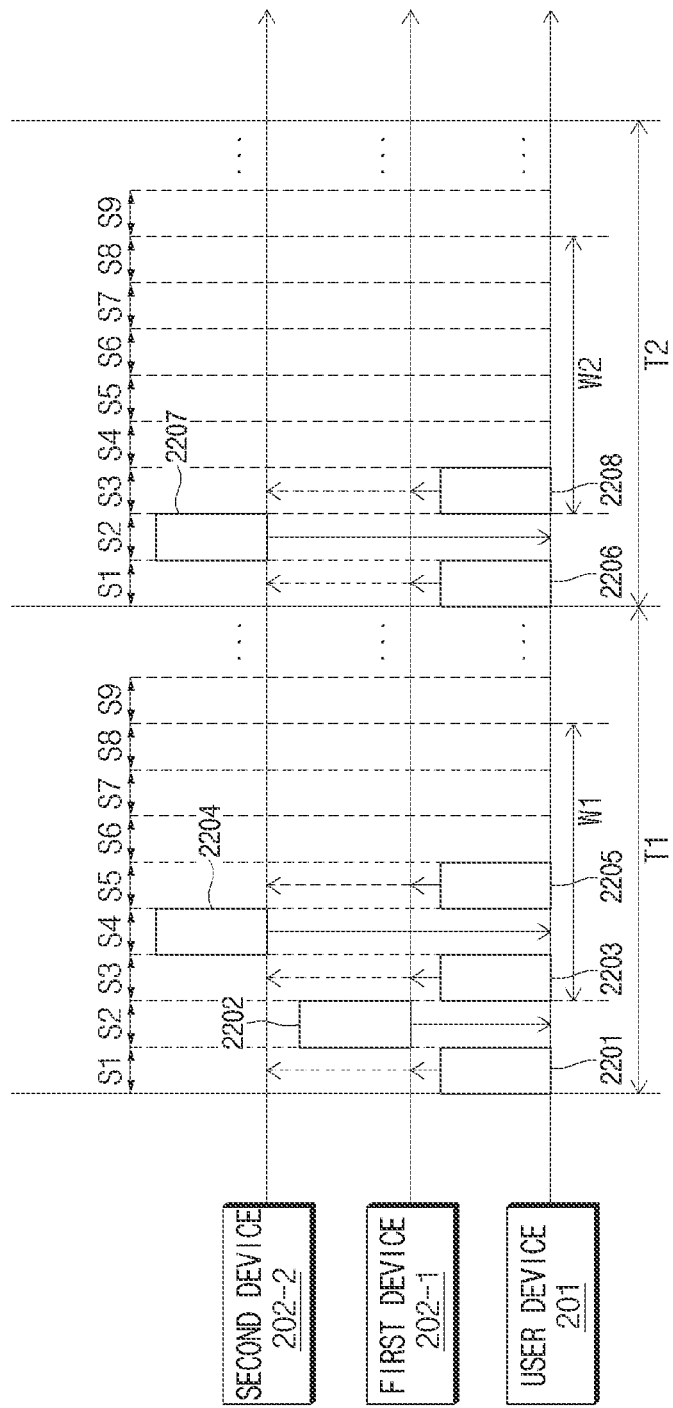
FIG. 22 is a diagram illustrating example packet exchange according to change of an audio data transmission device.

FIG. 22 illustrates another example of packet exchange according to change of an audio data transmission device.

In the example of FIG. 22, the first device 202-1 may be configured to transmit audio data, and the second device 202-2 may be configured to transmit additional data in a retransmission window. The eSCO link (e.g., the first link 205) between the user device 201 and the first device 202-1 is configured as described above with reference to FIG. 21.

On a first time slot S1 of a first transmission/reception interval T1, the user device 201 may transmit first data 2201 via the eSCO link generated with the first device 202-1. On a second time slot S2, the first device 202-1 may transmit second data 2202 including first audio data obtained by the first device 202-1 to the user device 201 via the eSCO link. In an example, the second data 2202 may further include ACK information about the first data 2201. On a first time slot (e.g., the third time slot S3) of a first retransmission window W1, the user device 201 may transmit third data 2203 including ACK for the second data 2202 to the first device 202-1 via the eSCO link.

On the fourth time slot S4 of the first transmission/reception interval T1, the second device 202-2 may transmit fourth data 2204 including additional data (e.g., second audio data) to the user device 201 via the eSCO link. For example, the fourth data 2204 may include the second audio data obtained through a microphone of the second device 202-2.

On the fifth slot S5 of the first transmission/reception interval T1, the user device 201 may transmit fifth data 2105 via the eSCO link. The fifth data 2205 may include ACK information about the fourth data 2204.

In the example of FIG. 22, the first device 202-1, the second device 202-2, or the user device 201 may determine an audio data transmission device based on the first audio data and the second audio data. The second device 202-2 may be determined as an audio data transmission device. The first device 202-1 and the second device 202-2 may perform a role change. Furthermore, the first device 202-1 may be determined not to transmit special data (audio data or additional data).

On a first time slot S1 of a second transmission/reception interval T2, the user device 201 may transmit sixth data 2206 via the eSCO link. The sixth data 2206 may be continuation data of the first data 2201 stored by the user device 201 in a transmission buffer in order to be transmitted to the first device 202-1. On a second time slot S2, the second device 202-2 may transmit, via the eSCO link, seventh data 2207 including audio data obtained by the second device 202-2. The seventh data 2207 may further include ACK information about the sixth data 2206. In response to reception of the seventh data 2207, the user device 201 may transmit eighth data 2208 including ACK information about the seventh data 2207.

The role change between the first device 202-1 and the second device 202-2 have been described with reference to FIGS. 21 and 22, but embodiments of the present disclosure are not limited thereto. For example, the role change may be performed between the plurality of microphones of the first device 202-1 in a manner similar to the manners illustrated in FIGS. 14 and 15. For example, the second data 2102 and the ninth data 2109 of FIG. 21 may be data obtained by a first microphone of the first device 202-1, and the fourth data 2104 and the seventh data 2107 may be data obtained by a second microphone of the first device 202-1. For example, the second data 2202 of FIG. 22 may be data obtained by the first microphone of the first device 202-1, and the fourth data 2204 and the seventh data 2207 may be data obtained by the second microphone of the first device 202-1.

An electronic device (e.g., the user device 201 of FIG. 4) according to an example embodiment may include: a first communication circuit (e.g., the first communication circuit 391 of FIG. 4) configured to support wireless communication, a second communication circuit (e.g., the second communication circuit 392 of FIG. 4) configured to support Bluetooth communication, a processor (e.g., the processor 320 of FIG. 4) operatively connected to the first communication circuit and the second communication circuit, and a memory (e.g., the memory 330 of FIG. 3) operatively connected to the processor. The memory may store one or more instructions that, when executed, cause the processor to control the electronic device to: create a link with a first device (e.g., the first device 202-1 of FIG. 4) based on a synchronous connection protocol using the second communication circuit, transmit first data to the first device via the link on a first time slot among a plurality of time slots of one transmission/reception period of the link, receive, from the first device via the link, second data including audio data obtained by the first device on a second time slot among the plurality of time slots, receive third data including additional data for the second data within a retransmission window configured for data retransmission among the plurality of time slots, and transmit audio data generated based on the second data and the third data to an external electronic device using the first communication circuit.

The one or more instructions, when executed, may cause the processor to control the electronic device to: transmit information indicating whether the additional data is supported to the first device when creating the link with the first device.

For example, the information indicating whether the additional data is supported may be indicated by codec information used in audio data of the link.

The one or more instructions, when executed, may cause the processor to control the electronic device to: retransmit the first data within the retransmission window based on the second data not being received on the second time slot or the second data including negative acknowledgement being received. For example, the third data may include audio data of an audio channel different from that of the second data. For example, the third data may include audio data obtained by a second device different from the first device. For example, the third data may include audio data of a time interval which is at least partially different from that of the second data in a time domain.

The one or more instructions, when executed, may cause the processor to control the electronic device to: transmit, to the first device, additional data for enhancing sound quality of first audio data included in the first data within the retransmission window.

For example, the synchronous connection protocol may be extended synchronous connection oriented (eSCO).

The one or more instructions, when executed, may cause the processor to determine, based on noise levels of the audio data and the additional data, a device that is to transmit audio data on a second time slot among a plurality of time slots of a transmission/reception interval subsequent to the one transmission/reception interval, among the first device and the second device.

According to an example embodiment, an electronic device (e.g., the first device 202-1 of FIG. 4) may include: an audio reception circuit (e.g., the audio reception circuit 481 of FIG. 4) connected to at least one microphone, a wireless communication circuit (the communication circuit 491 of FIG. 4) configured to support Bluetooth communication, a processor (e.g., the processor 421 of FIG. 4) operatively connected to the audio reception circuit and the wireless communication circuit, and a memory (e.g., the memory 431 of FIG. 4) operatively connected to the processor. The memory may store one or more instructions that, when executed, cause the processor to control the electronic device to: connect to a first external electronic device (e.g., the user device 201 of FIG. 4) via a first link using the wireless communication circuit, connect to a second external electronic device (e.g., the second device 202-2 of FIG. 4) via a second link using the wireless communication circuit, transmit first link information including channel information about the first link to the second external electronic device via the second link, create an extended synchronous connection oriented (eSCO) link with the first electronic device via the first link, receive, from the first external electronic device, first data on a first time slot among a plurality of time slots of one transmission/reception period of the eSCO link, transmit, to the first external electronic device, second data including audio data obtained using the audio reception circuit on a second time slot among the plurality of time slots, and transmit additional data for enhancing sound quality of the audio data in a retransmission window configured for data retransmission among the plurality of time slots.

For example, the audio reception circuit may be connected to a first microphone and a second microphone, the audio data may be obtained through the first microphone, and the additional data may include audio data obtained through the second microphone.

For example, the second data and the additional data may be obtained in at least partially different time domains.

The one or more instructions, when executed, may cause the processor to control the electronic device to: transmit the additional data based on audio codec information associated with the eSCO link corresponding to a specified codec, and to not transmit the additional data based on the audio codec information associated with the eSCO link not corresponding to the specified codec.

The one or more instructions, when executed, may cause the processor to control the electronic device to: receive additional data for enhancing the data from the first external electronic device in the retransmission window.

According to an example embodiment, an audio data transmission method of an electronic device (e.g., the user device 201) may include: creating an extended synchronous connection oriented (eSCO) link with a first device via a first link, transmitting first data on a first time slot among a plurality of time slots of one transmission/reception interval of the eSCO link, receiving second data from the first device on a second time slot among the plurality of time slots, attempting to receive third data within at least one retransmission time slot among the plurality of time slots, and transmitting audio data generated based on the second data and the third data to an external electronic device upon receiving the third data within the at least one retransmission time slot.

For example, the method may further include transmitting audio data generated based on the second data to the external electronic device based on the third data not being received within the at least one retransmission time slot.

The method may further include generating the audio data by enhancing sound quality of the second data using the third data. For example, the third data may include audio data of an audio channel different from that of the second data. For example, the third data may include audio data obtained by a second device different from the first device. For example, the third data may include audio data of an interval which is at least partially different from that of the second data in a time domain. The method may further include determining, based on noise levels of the second data and the third data, a device that is to transmit audio data on a second time slot among a plurality of time slots of a transmission/reception interval subsequent to the one transmission/reception interval, among the first device and the second device.

According to various example embodiments of the present disclosure, an electronic device may provide audio data with enhanced sound quality using additional data.

The electronic device may provide audio data with enhanced sound quality using an external electronic device having relatively high performance.

The electronic device may reduce battery consumption of the electronic device due to retransmission by determining an electronic device for performing retransmission.

Various effects may be provided that are directly or indirectly identified through the present disclosure.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents.

What is claimed is:

1. An electronic device comprising:
   a first communication circuit configured to support wireless communication;
   a second communication circuit configured to support Bluetooth communication;
   at least one processor operatively connected to the first communication circuit and the second communication circuit; and
   a memory operatively connected to the at least one processor,
   wherein the memory stores one or more instructions to be executed by the at least one processor, wherein the at least one processor is collectively and/or individually configured to control the electronic device to:
   establish a Bluetooth link with an external audio device comprising a first external audio device and a second external audio device based on a synchronous connection protocol using the second communication circuit,
   perform a call with an external phone device over a cellular network using the first communication circuit,
   receive, using the first communication circuit, first voice data from the external phone device over the cellular network,
   transmit, using the second communication circuit, first audio data on a first time slot among a plurality of time slots of a first transmission/reception period of the Bluetooth link to the first external audio device via the Bluetooth link, the first audio data including the first voice data,
   receive, via the Bluetooth link from the first external audio device, second audio data on a second time slot among the plurality of time slots, the second audio data being obtained by the first external audio device,
   receive, via the Bluetooth link from the second external audio device, additional data associated with the second audio data within a retransmission time slot among the plurality of time slots, the additional data obtained by the second external audio when the second audio data was obtained and including information for enhancing the second audio data,
   generate enhanced second audio data by enhancing sound quality of the second audio data using the additional data associated with the second audio data, and
   transmit second voice data to the external phone device over the cellular network using the first communication circuit, the second voice data including the enhanced second audio data.

2. The electronic device of claim 1, wherein the one or more instructions, when executed, cause the at least one processor to control the electronic device to: transmit, to the first external audio device, information indicating whether the additional data is supported when creating the link with the external audio device.

3. The electronic device of claim 2, wherein the information indicating whether the additional data is supported includes codec information used in audio data of the Bluetooth link.

4. The electronic device of claim 1, wherein the one or more instructions, when executed, cause the at least one processor to control the electronic device to: retransmit the first audio data to the first external audio device over the Bluetooth link within a retransmission window of the first transmission/reception period based on the second audio data not being received on the second time slot or the second audio data including negative acknowledgement being received.

5. The electronic device of claim 1, wherein the additional data includes audio data of an audio channel different from that of the second audio data.

6. The electronic device of claim 1, wherein the additional data includes audio data of a time interval at least partially different from that of the second audio data in a time domain.

7. The electronic device of claim 1, wherein the one or more instructions, when executed, cause the at least one processor to control the electronic device to: transmit, to the first external audio device, additional data for enhancing sound quality of the first audio data within a retransmission window of the first transmission/reception period.

8. An electronic audio device comprising:
   an audio reception circuit connected to a first microphone;
   a wireless communication circuit configured to support Bluetooth communication;
   least one process operatively connected to the audio reception circuit and the wireless communication circuit; and
   a memory operatively connected to the at least one processor,
   wherein the memory stores one or more instructions to be executed by the at least one processor, the at least one processor individually and/or collectively configured to control the electronic audio device to:
   connect to an external phone device via a first Bluetooth link using the wireless communication circuit,
   create an extended synchronous connection oriented (eSCO) link with the external phone device via the first Bluetooth link, receive, from the external phone device via the eSCO link, first audio data on a first time slot among a plurality of time slots of a transmission/reception period of the eSCO link, obtain second audio data through the first microphone, obtain third audio data from another electronic audio device including a second microphone, wherein the third audio data is obtained by the second microphone same time the second audio date is obtained by the first microphone, transmit, to the external phone device on a second time slot among the plurality of time slots of the transmission/reception period of the eSCO link, the second audio data, and transmit, to the external phone device on a retransmission time slot among the plurality of time slots of the transmission/reception period of the eSCO link, additional data including a sound quality enhancement parameter for enhancing sound quality of the second audio data, sound quality enhancement parameter including comparison information generated based on a comparison between the third audio data obtained by the second microphone and the second audio date obtained by the first microphone.

9. The electronic audio device of claim 8, wherein the audio reception circuit is connected to a first microphone and a second microphone, wherein the additional data includes third audio data obtained through the second microphone.

10. The electronic audio device of claim 8, wherein the one or more instructions, when executed, cause the at least one processor to control the electronic audio device to:

transmit, to the external phone device via the eSCO link, the additional data based on audio codec information associated with the eSCO link corresponding to a specified codec; and refrain from transmitting the additional data based on the audio codec information associated with the eSCO link not corresponding to the specified codec.

11. A method of transmitting audio data of an electronic device, comprising:

creating an extended synchronous connection oriented (eSCO) link with an external audio device comprising a first external audio device and a second external audio device;

performing a call with an external phone device over a cellular network;

receiving, from the external phone device over a cellular network, first voice data during the call;

transmitting, to the first external audio device via the eSCO link, first audio data on a first time slot among a plurality of time slots of a first transmission/reception interval of the eSCO link, the first audio data including the first voice data;

receiving, from the first external audio device via the eSCO link, second audio data on a second time slot among the plurality of time slots;

receiving, from the second external audio device via the eSCO link, additional data associated with the second audio data within at least one retransmission time slot among the plurality of time slots, wherein the additional data is obtained by the second external audio device at a same time that the second audio data obtained by the first external audio device;

generating enhanced second audio data by enhancing sound quality of the second audio data using the additional data associated with the second audio data; and transmitting second voice data to the external phone device over the cellular network, the second voice data including the enhanced second audio data.

12. The method of claim 11, further comprising transmitting, to the first external audio device, information indicating whether the additional data is supported when creating the eSCO link with the first external audio device.

13. The method of claim 11, wherein the additional data includes audio data of an audio channel different from that of the second audio data.

* * * * *